(12) United States Patent
Konishi et al.

(10) Patent No.: US 6,501,854 B1
(45) Date of Patent: Dec. 31, 2002

(54) INFORMATION PROCESSING APPARATUS, AN INFORMATION PROCESSING METHOD AND A MEDIUM

(75) Inventors: Toru Konishi, Kanagawa (JP); Junichi Rekimoto, Tokyo (JP); Takahiko Sueyoshi, Tokyo (JP); Keigo Ihara, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/364,466

(22) Filed: Jul. 30, 1999

(30) Foreign Application Priority Data

Jul. 31, 1998 (JP) ............................................. 10-217298
Jul. 31, 1998 (JP) ............................................. 10-217299

(51) Int. Cl.[7] .............................. G06K 9/00; G06K 7/10; H04N 1/00; G06F 17/60; G06F 15/16
(52) U.S. Cl. ........................ 382/181; 382/100; 382/139; 382/183; 382/190; 382/305; 382/306; 235/462.01; 235/462.09; 235/462.2; 235/462.11; 358/403; 705/23; 705/26; 707/1; 707/6; 707/10; 707/200; 709/200; 709/203; 709/217; 709/218; 709/219
(58) Field of Search ................................ 382/100–102, 382/137, 139, 181–183, 190, 205, 206, 209, 218, 305, 306, 312, 313; 235/375, 462.01, 462.05, 462.07, 462.09, 462.1, 462.11, 462.45; 358/403; 705/23, 26; 707/1, 2, 6, 10, 200; 709/200, 217, 218, 219, 203, 208, 216

(56) References Cited

U.S. PATENT DOCUMENTS 5,727,156 A * 3/1998 Herr-Hoyman et al. ..... 709/219
5,804,803 A * 9/1998 Cragun et al. ............... 235/375
5,938,727 A * 8/1999 Ikeda .......................... 709/218
5,978,773 A * 11/1999 Hudetz et al. ................. 705/23
6,027,024 A * 2/2000 Knowles ................. 235/472.01
6,036,094 A * 3/2000 Goldman et al. ....... 235/462.45
6,108,656 A * 8/2000 Durst et al. .................... 707/10
6,199,048 B1 * 3/2001 Hudetz et al. ................. 705/23
6,220,509 B1 * 4/2001 Byford ........................ 235/375
6,321,992 B1 * 11/2001 Knowles et al. ........ 235/478.01

* cited by examiner

Primary Examiner—Leo Boudreau
Assistant Examiner—Daniel G. Mariam
(74) Attorney, Agent, or Firm—Frommer Lawrence & Haug LLP; William S. Frommer; Glenn F. Savit

(57) ABSTRACT

Disclosed herein is an information processing apparatus comprising: an image acquiring means for acquiring an objective image; an identification information recognizing means for recognizing, of the objective image acquired by said image acquiring means, identification information corresponding to a specific image pattern; a decision means for deciding whether said identification information recognized by said identification information recognizing means is local identification information for starting processing previously registered for each terminal or global identification information for starting processing common to all terminals; a local executing means for executing, if said identification information is decided as the local identification information by said decision means, the processing previously registered for each terminal; a global processing requesting means for requesting, if said identification information is decided as the global identification information by said decision means, a specific server to execute the global processing corresponding to said identification information; and a global processing result acquiring means for acquiring the result of said global processing by said specific server.

16 Claims, 20 Drawing Sheets

2D CODE PROCESSING SYSTEM

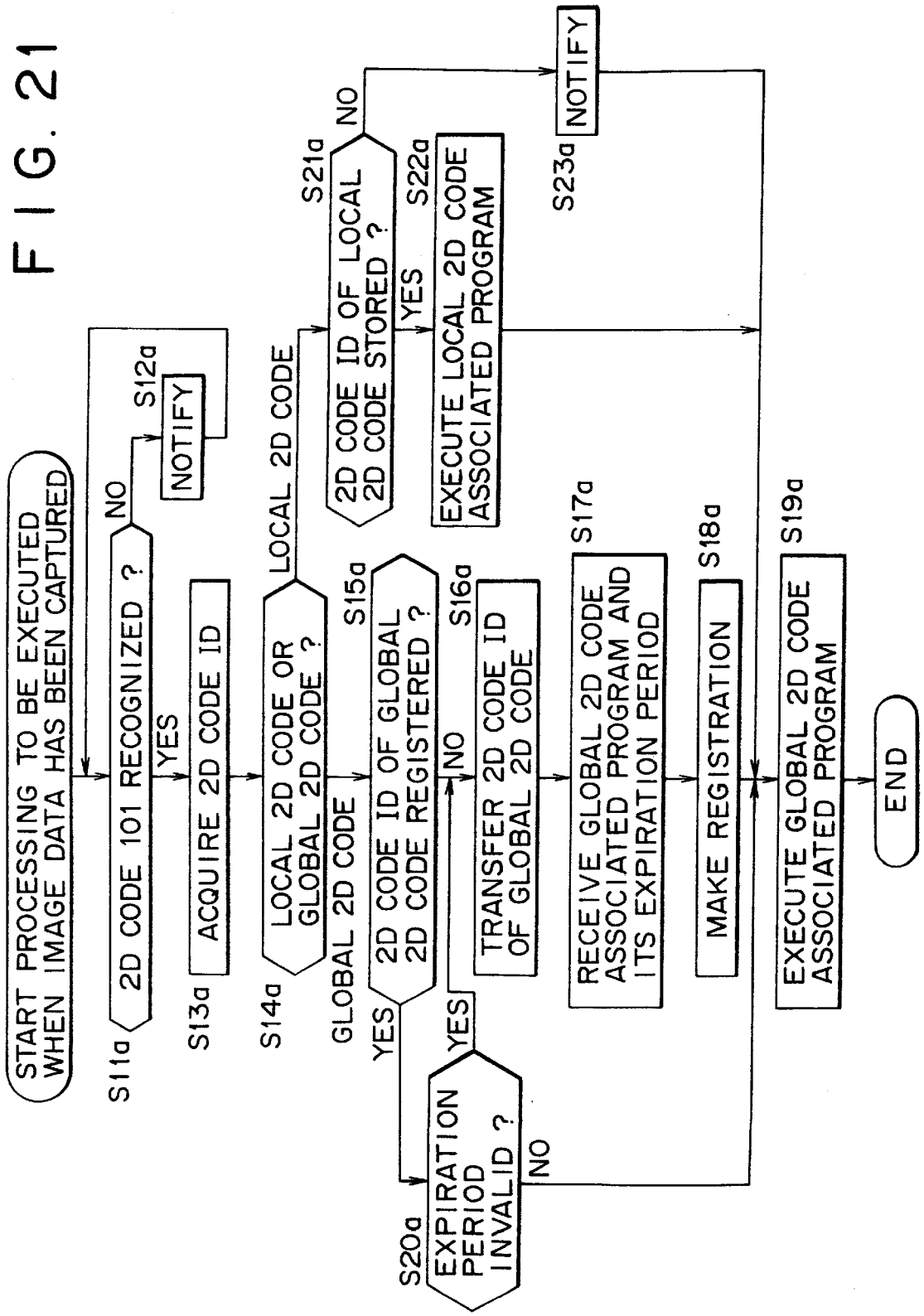

US 6,501,854 B1

INFORMATION PROCESSING APPARATUS, AN INFORMATION PROCESSING METHOD AND A MEDIUM

BACKGROUND OF THE INVENTION

The present invention relates generally to an information processing apparatus, an information processing method, and a medium, and more particularly, to an information processing apparatus, an information processing method, and a medium which are adapted such that, by making a server execute processing corresponding to a two-dimensional bar code to be used in a shared manner, a plurality of terminals can acquire a same processing result for the two-dimensional bar code.

Bar codes are currently used in many industrial fields as a means for acquiring the identification information about products in an easy and secure manner. For example, in various wholesale/retail shops, products are identified from the bar codes attached thereon and the corresponding prices (stored in memory in advance) are read from a database to be displayed on a display unit.

In addition to the above-mentioned application in which products are identified and controlled based on the identification information read from code patterns, a more versatile application is currently proposed in which predetermined processing corresponding to code patterns are executed.

FIG. 16 is a schematic diagram illustrating a two-dimensional (2D) code processing system so-called "CyberCode" for executing processing corresponding to a two-dimensional bar code (hereafter referred to as a 2D code) previously proposed by the applicant hereof as the Japanese Published Unexamined Patent Application No. Hei10-184351.

Illustratively, the following description is available at the time of submitting this application from the home page offered by this applicant at (URL): http://www.sony.co.jp/sd/ProductsPark/Consumer/PCOM/PCG-C1CAT/cybercode.html "What we call "CyberCode" is Sony's unique two-dimensional code system that offers about 16.77 million different patterns (in 24 bits). Of these patterns, about one million patterns (in 20 bits) may be registered as desired for program start-up purposes. The remaining code patterns are reserved for future service expansion. "CyberCode" works as an index to what is represented by the code in question, the index allowing relevant information to be retrieved from computer storage. When a user starts a program through a new interface feature "CyberCode Finder," the user finds that the corresponding information leaps from the object having the "CyberCode" onto the computer screen."

In this example, an object 100 is a card shaped like a business card, a 2D code 101 being attached (or printed) thereon. The 2D code 101 is provided with a cell portion A and a logo portion B spaced from each other by one block in a rectangular range which is 9.5-block-high and 7-block-wide, taking one block as a unit as shown in FIG. 17. In the cell portion A of 7-block-high and 7-block-wide square, square cells are two-dimensionally patterned in the square range for forming a code pattern. It should be noted that, in correspondence to this code pattern, the identification number (hereafter referred to as a 2D code ID) of a 2D code represented by a 24-bit bit code is set.

In the logo portion B, a large rectangular cell having 1.5-block-high and 7-block-wide is arranged, in which the name of the object 100 or an advertisement mark (a logo) is written.

A 2D code associated program executing unit 201 reads the 2D code ID of the 2D code 101 from the image data of the 2D code 101 read by a bar code reader, not shown, and searches a local 2D code database 201A incorporated in the program executing unit to execute a program (hereafter referred to as a 2D code associated program) associated with the 2D code ID.

Like the 2D code associated program executing unit 201, a 2D code associated program executing unit 202 reads a 2D code ID from the image data of the 2D code 101 and searches a local 2D code database 202A to execute a 2D code associated program associated with the 2D code ID.

Thus, simply making the 2D code associated program executing units 201 and 202 read a 2D code can execute a 2D code associated program corresponding to that 2D code. However, because the 2D code associated program executing unit 201 or 202 is adapted to set any program in correspondence to any bar code, different programs are required to set to one 2D code in an associative manner and information (hereafter referred to as 2D code associated information) about the assignment between 2D code and program is not shared. Consequently, it is difficult to execute one session of processing for one 2D code between the 2D code associated program executing units 201 and 202.

SUMMARY OF THE INVENTION

It is therefore an object of the present invention to provide efficiently execute processing corresponding to a pattern composed of a two-dimensional bar code for example.

According to the first aspect of the present invention, there is provided an information processing apparatus including: an image acquiring means for acquiring an objective image; an identification information recognizing means for recognizing, of the objective image acquired by the image acquiring means, identification information corresponding to a specific image pattern; a decision means for deciding whether the identification information recognized by the identification information recognizing means is local identification information for starting processing previously registered for each terminal or global identification information for starting processing common to all terminals; a local executing means for executing, if the identification information is decided as the local identification information by the decision means, the processing previously registered for each terminal; a global processing requesting means for requesting, if the identification information is decided as the global identification information by the decision means, a specific server to execute the global processing corresponding to the identification information; and a global processing result acquiring means for acquiring the result of the global processing by the specific server.

According to the second aspect of the present invention, there is provided an information processing apparatus including: an image acquiring means for acquiring an objective image; an identification information recognizing means for recognizing, of the objective image acquired by the image acquiring means, identification information corresponding to a specific image pattern; a decision means for deciding whether the identification information recognized by the identification information recognizing means is local identification information for starting processing previously registered for each terminal or global identification information for starting processing common to all terminals; a validity condition registering means for previously registering a validity condition of the global identification information; a validity condition decision means for deciding whether or not the identification information recognized by the identification information recognizing means satisfies the validity condition registered in the validity condition registering means; a global processing executing means for executing, when the identification information is decided as global identification information by the decision means and is decided to satisfy the validity condition by the validity condition decision means, global processing corresponding to the identification information; an update information requesting means for requesting, if the identification information is decided as global identification information by the decision means and is decided not to satisfy the validity condition by the validity condition decision means, update information associated with global processing corresponding to the identification information from a specific server; and an updated global processing executing means for updating the validity condition registered in the validity condition registering means on the basis of the update information acquired by the specific server and executing the updated global processing on the basis of the update information.

According to the third aspect of the present invention, there is provided an information processing method including: an image acquiring step of acquiring an objective image; an identification information recognizing step of recognizing, of the objective image acquired by the image acquiring step, identification information corresponding to a specific image pattern; a decision step of deciding whether the identification information recognized by the identification information recognizing step is local identification information for starting processing previously registered for each terminal or global identification information for starting processing common to all terminals; a local executing step of executing, if the identification information is decided as the local identification information by the decision step, the processing previously registered for each terminal; a global processing requesting step for requesting, if the identification information is decided as the global identification information by the decision step, a specific server to execute the global processing corresponding to the identification information; and a global processing result acquiring step of acquiring the result of the global processing by the specific server.

According to the fourth aspect of the present invention, there is provided a medium which allows an information processing apparatus to execute a program, the program including: an image acquiring step of acquiring an objective image; an identification information recognizing step of recognizing, of the objective image acquired by the image acquiring step, identification information corresponding to a specific image pattern; a decision step of deciding whether the identification information recognized by the identification information recognizing step is local identification information for starting processing previously registered for each terminal or global identification information for starting processing common to all terminals; a local executing step of executing, if the identification information is decided as the local identification information by the decision step, the processing previously registered for each terminal; a global processing requesting step for requesting, if the identification information is decided as the global identification information by the decision step, a specific server to execute the global processing corresponding to the identification information; and a global processing result acquiring step of acquiring the result of the global processing by the specific server.

According to the fifth aspect of the present invention, there is provided an information processing method including: an image acquiring step of acquiring an objective image; an identification information recognizing step of recognizing, of the objective image acquired by the image acquiring step, identification information corresponding to a specific image pattern; a decision step of deciding whether the identification information recognized by the identification information recognizing step is local identification information for starting processing previously registered for each terminal or global identification information for starting processing common to all terminals; a validity condition registering step of previously registering a validity condition of the global identification information; a validity condition decision step of deciding whether or not the identification information recognized by the identification information recognizing step satisfies the validity condition registered in the validity condition registering step; a global processing executing step for executing, when the identification information is decided as global identification information by the decision step and is decided to satisfy the validity condition by the validity condition decision step, global processing corresponding to the identification information; an update information requesting step of requesting, if the identification information is decided as global identification information by the decision step and is decided not to satisfy the validity condition by the validity condition decision step, update information associated with global processing corresponding to the identification information from a specific server; and an updated global processing executing step of updating the validity condition registered in the validity condition registering step on the basis of the update information acquired by the specific server and executing the updated global processing on the basis of the update information.

According to the sixth aspect of the present invention, there is provided a medium which allows an information processing apparatus to execute a program, the program including: an image acquiring step of acquiring an objective image; an identification information recognizing step of recognizing, of the objective image acquired by the image acquiring step, identification information corresponding to a specific image pattern; a decision step of deciding whether the identification information recognized by the identification information recognizing step is local identification information for starting processing previously registered for each terminal or global identification information for starting processing common to all terminals; a validity condition registering step of previously registering a validity condition of the global identification information; a validity condition decision step of deciding whether or not the identification information recognized by the identification information recognizing step satisfies the validity condition registered in the validity condition registering step; a global processing executing step for executing, when the identification information is decided as global identification information by the decision step and is decided to satisfy the validity condition by the validity condition decision step, global processing corresponding to the identification information; an update information requesting step of requesting, if the identification information is decided as global identification information by the decision step and is decided not to satisfy the validity condition by the validity condition decision step, update information associated with global processing corresponding to the identification information from a specific server; and an updated global processing executing step of updating the validity condition registered in the validity condition registering step on the basis of the update information acquired by the specific server and executing the updated global processing on the basis of the update information.

These and other objects will become more apparent when a preferred embodiment of this invention is considered in connection with the drawings.

BRIEF DESCRIPTION OF THE DRAWINGS

FIG. 21 is a flowchart describing the operation of a CPU of the personal computer to be executed when image data has been captured.

DESCRIPTION OF THE PREFERRED EMBODIMENT

This invention will be described in further detail by way of example with reference to the accompanying drawings.

Figure 1:
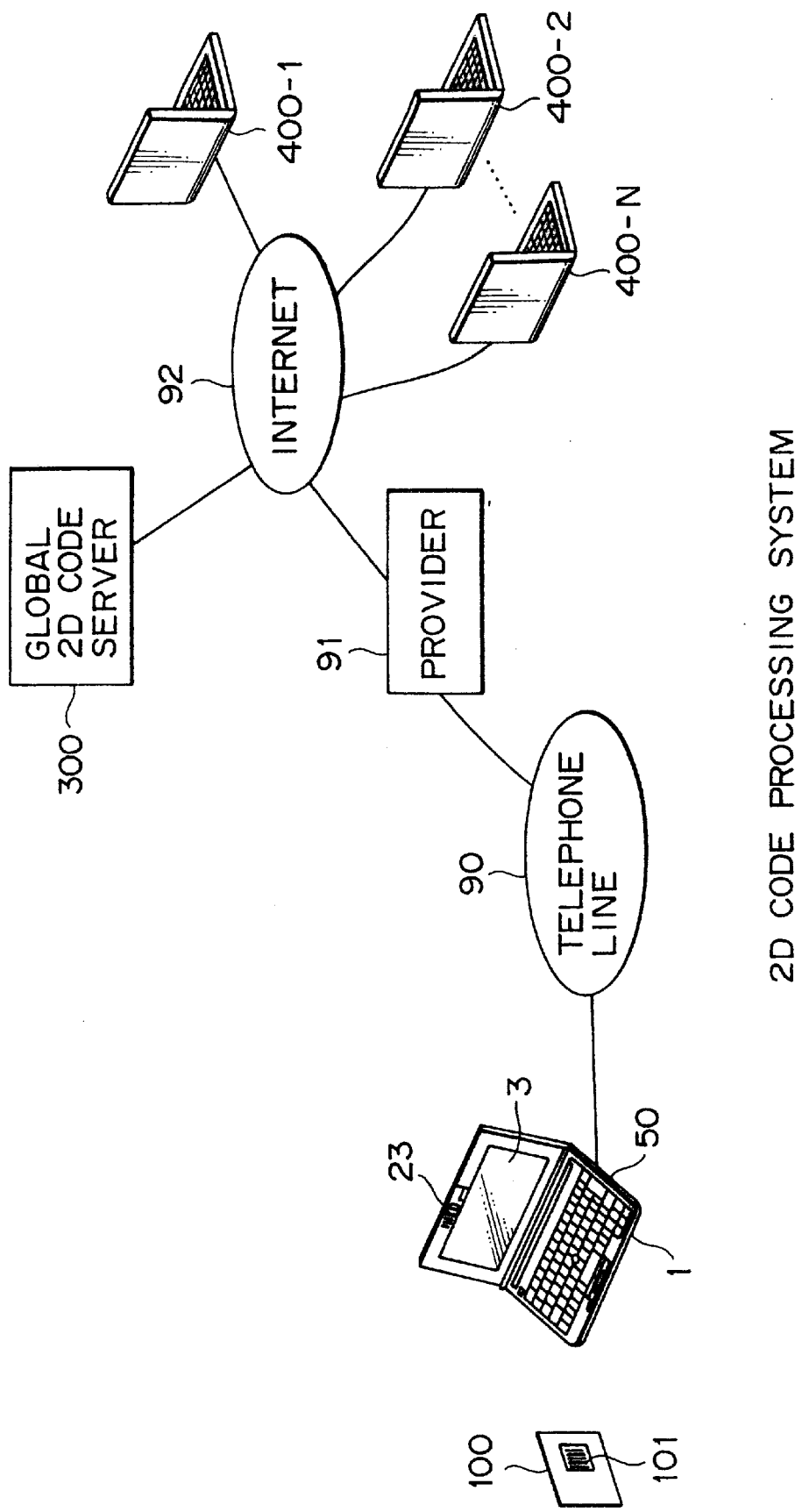
FIG. 1 is a schematic diagram illustrating an exemplary configuration of a 2D code processing system practiced as a first embodiment of the present invention.

FIG. 1 is a schematic diagram illustrating an exemplary configuration of a 2D code processing system practiced as a first embodiment of the invention.

The personal computer 1 is a note-type personal computer and has a CCD video camera 23 on a display part 3 of the personal computer 1. The personal computer 1 is adapted to recognize a pattern of a 2D code 101 from the image data of the 2D code 101 and an object 100 obtained by the image pickup through the CCD video camera 23, and if the recognized pattern is found a local 2D code (to be described later), execute predetermined processing corresponding to that code pattern.

The personal computer 1 also has a modem 50 through which the personal computer is connected to the Internet 92 via a public telephone line 90 and an Internet service provider 91, thereby accessing the global 2D code database server (hereafter referred to as a global 2D code server) 300, which is connected to the Internet 92.

The global 2D code server 300 stores the 2D code ID of a 2D code preset as a global 2D code (to be described later) among other 2D codes and executes the predetermined processing corresponding to that global 2D code.

Terminals 400-1 through 400-N (if the terminals 400-1 through 400-N need not be distinguished individually, these terminals are simply referred to as the terminal 400; this holds true with other components), if the 2D code read is a local 2D code, executes the predetermined processing corresponding to that 2D code, like the personal computer 1. The terminal 400 may also access to the global 2D code server 300 through the Internet 92.

The 2D code 101 contains a coded 2D code ID consisting of 24 bits. In this example, about one million of 2D codes with a value in a range of 0x000000 through 0x0FFFFF being a 2D code are referred to as local 2D codes and about fifteen million of 2D codes with a value in a range of 0x100000 through 0xFFFFFF being a 2D code ID are referred to as global 2D codes. The bit code range of these local 2D codes and global 2D codes (hereafter referred to as a 2D code bit range) is specified beforehand by the system administrator of the 2D code processing system and provided to the subscribers of the 2D code processing system. The subscribers are notified of a common URL (Uniform Resource Locator) for an access to the global 2D code server 300.

Figure 2:
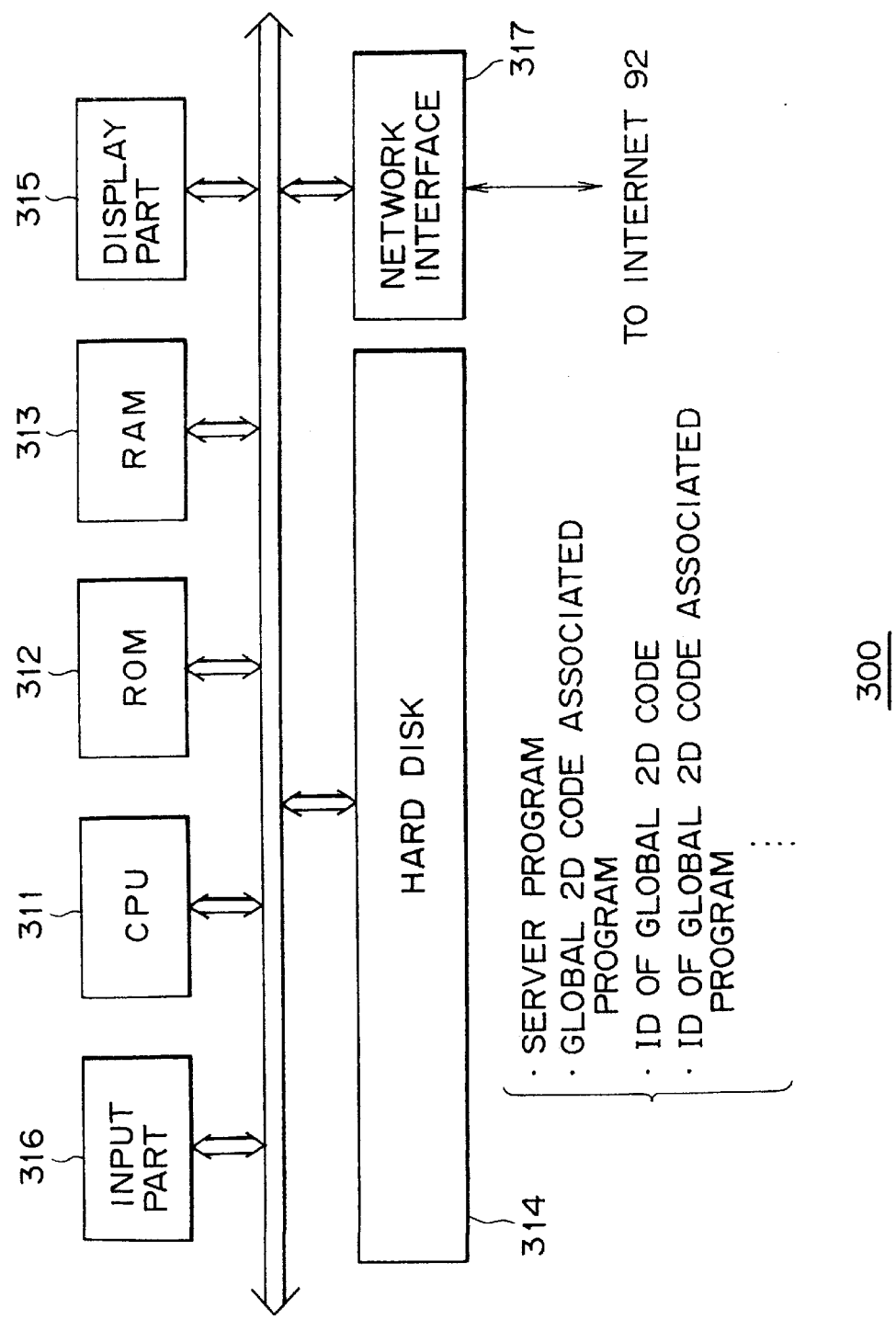
FIG. 2 is a block diagram illustrating an example of the configuration of the global 2D code server in FIG.

FIG. 2 is a block diagram illustrating an example of the configuration of the global 2D code server 300. A CPU 311 is adapted to execute various processing as instructed by a program stored in a ROM 312 or a hard disk 314.

The ROM 312 stores programs to be executed at start-up and various data. A RAM 313 is adapted to temporarily store data and programs when the CPU 311 executes processing. The hard disk 314 stores a server program and a global 2D code associated program to be executed in association with the global 2D code in addition to the 2D code ID for the global 2D code and the ID of the global 2D code associated program corresponding thereto.

A display part 315 displays an image based on the image data supplied from the CPU 311. An input block 316 is operated by the system administrator of the global 2D code server 300 when issuing various commands to the CPU 311.

A network interface 317 is connected to the Internet 92 to receive packet addressed to the global 2D code server 300 and, at the same time, generates a packet according to IP (Internet Protocol) from the data supplied from the CPU 311 to output the generated packet to the Internet 92.

Figure 3:
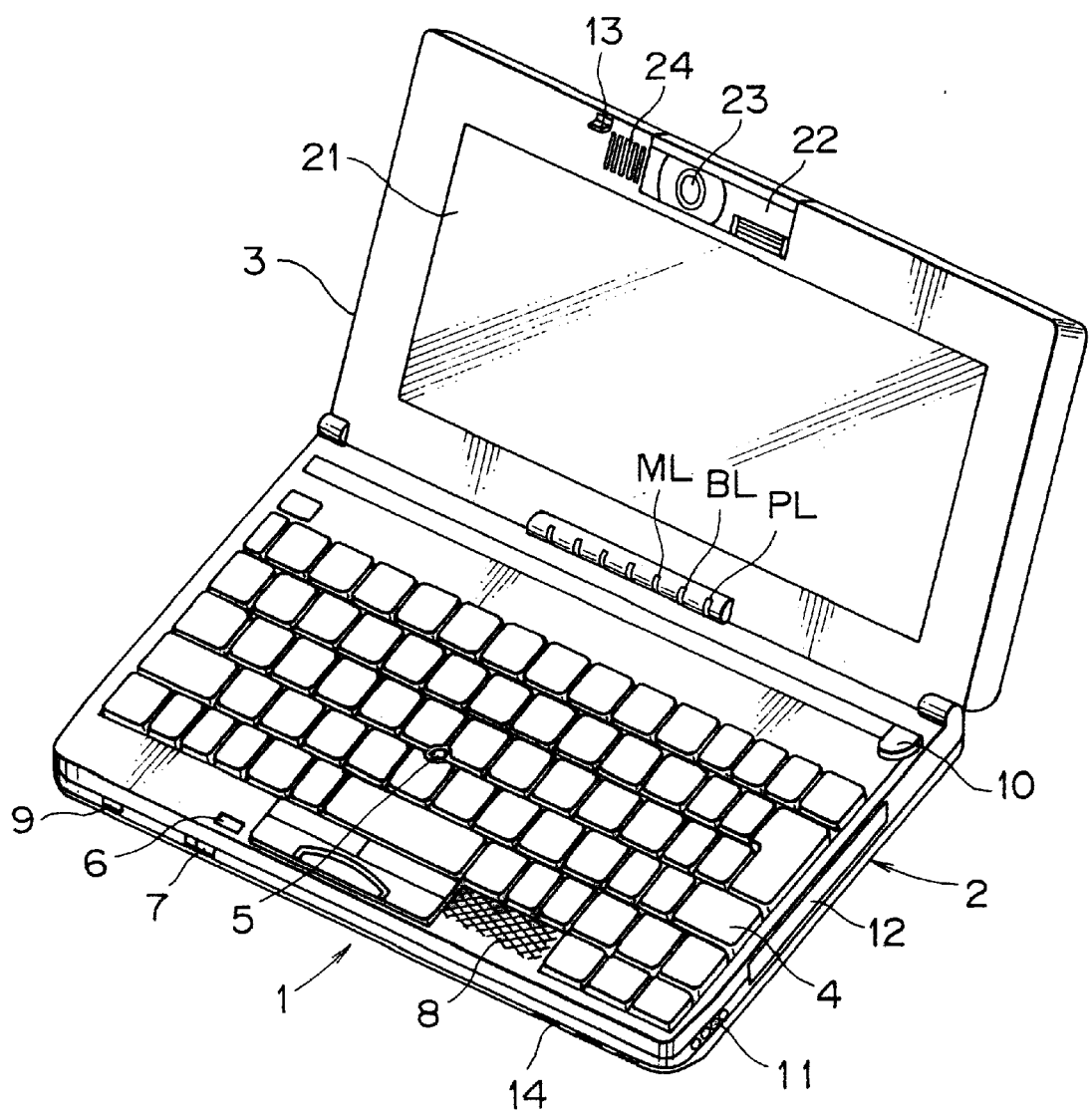
FIG. 3 is a perspective view illustrating a portable personal computer to which the present invention is applied with the display part opened.
Figure 4:
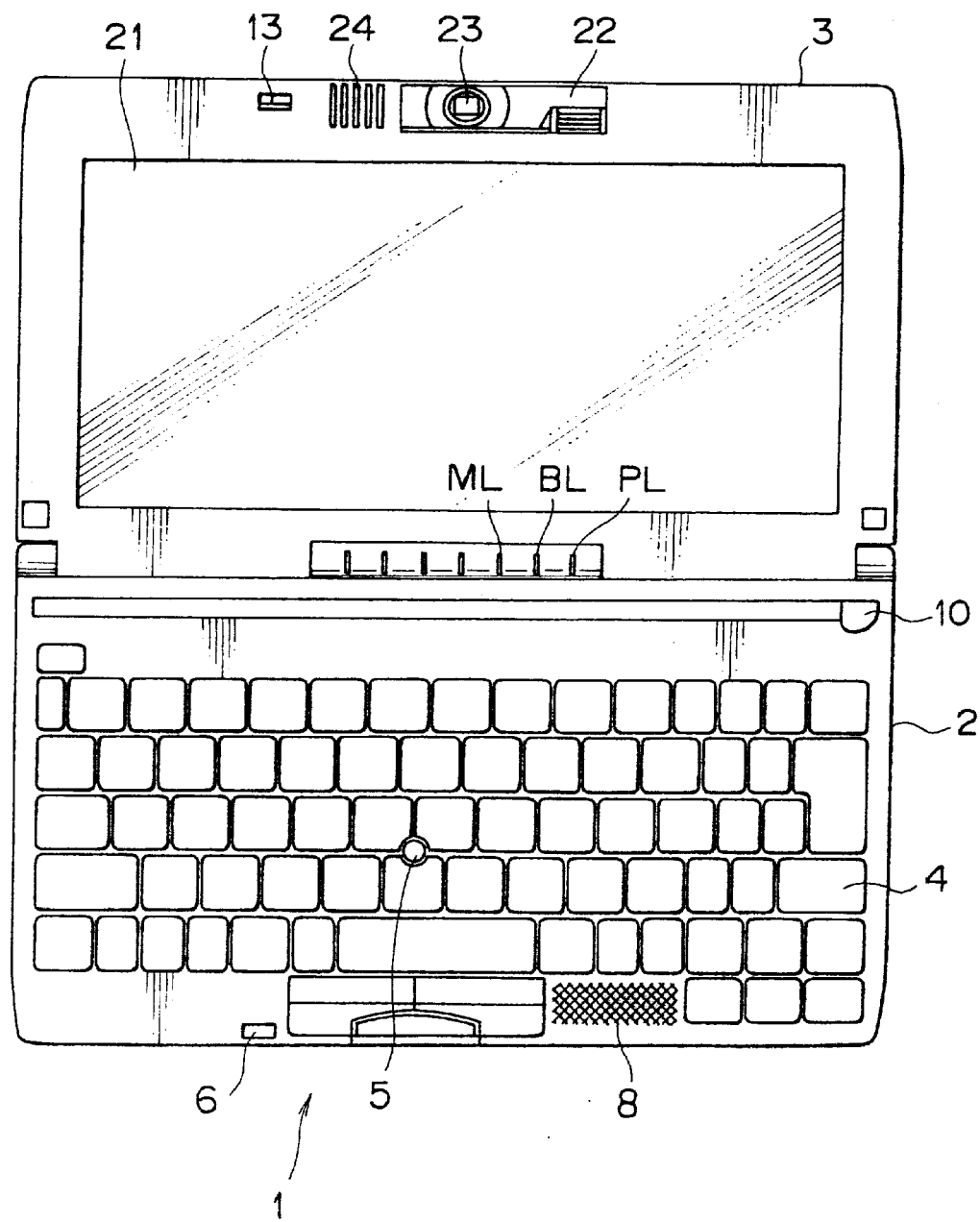
FIG. 4 is a top view of FIG. 1.
Figure 5:
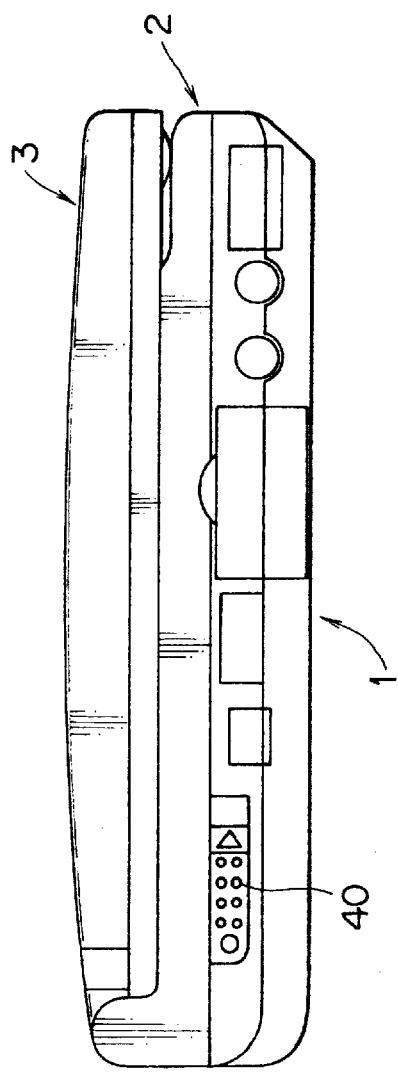
FIG. 5 is a left side view illustrating the personal computer with the display part closed relative to the body shown in FIG. 1.
Figure 6:
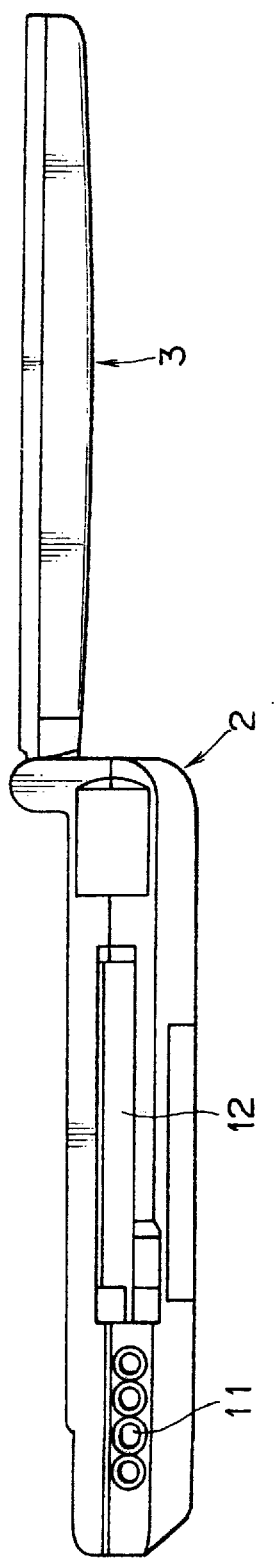
FIG. 6 is a right side view illustrating the personal computer with the display part opened 180 degrees relative to the body shown in FIG. 1.
Figure 7:
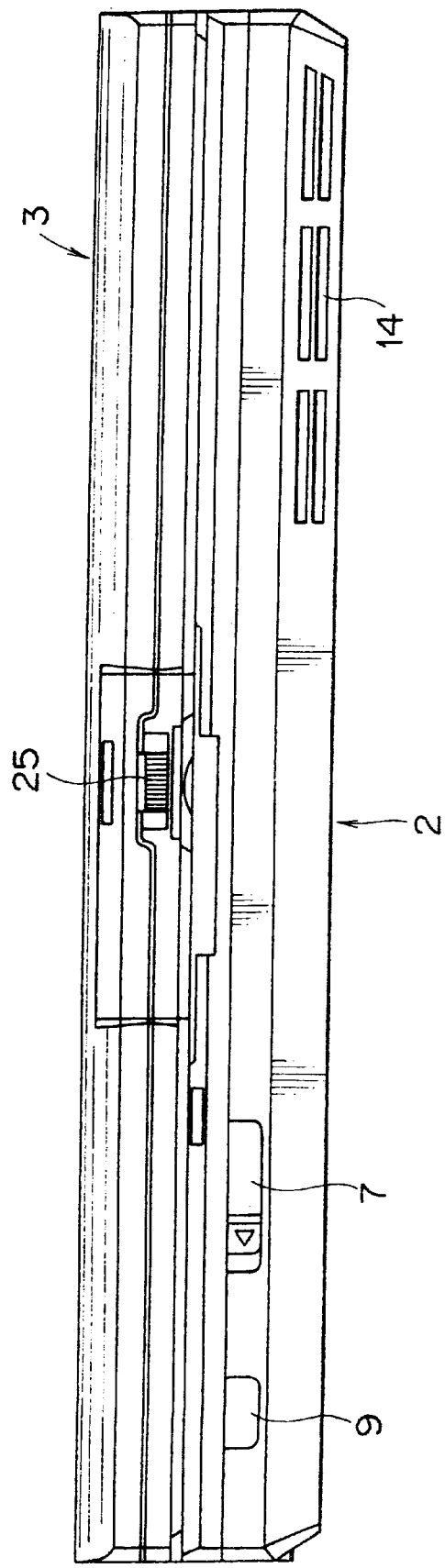
FIG. 7 is an elevational view of FIG. 3.
Figure 8:
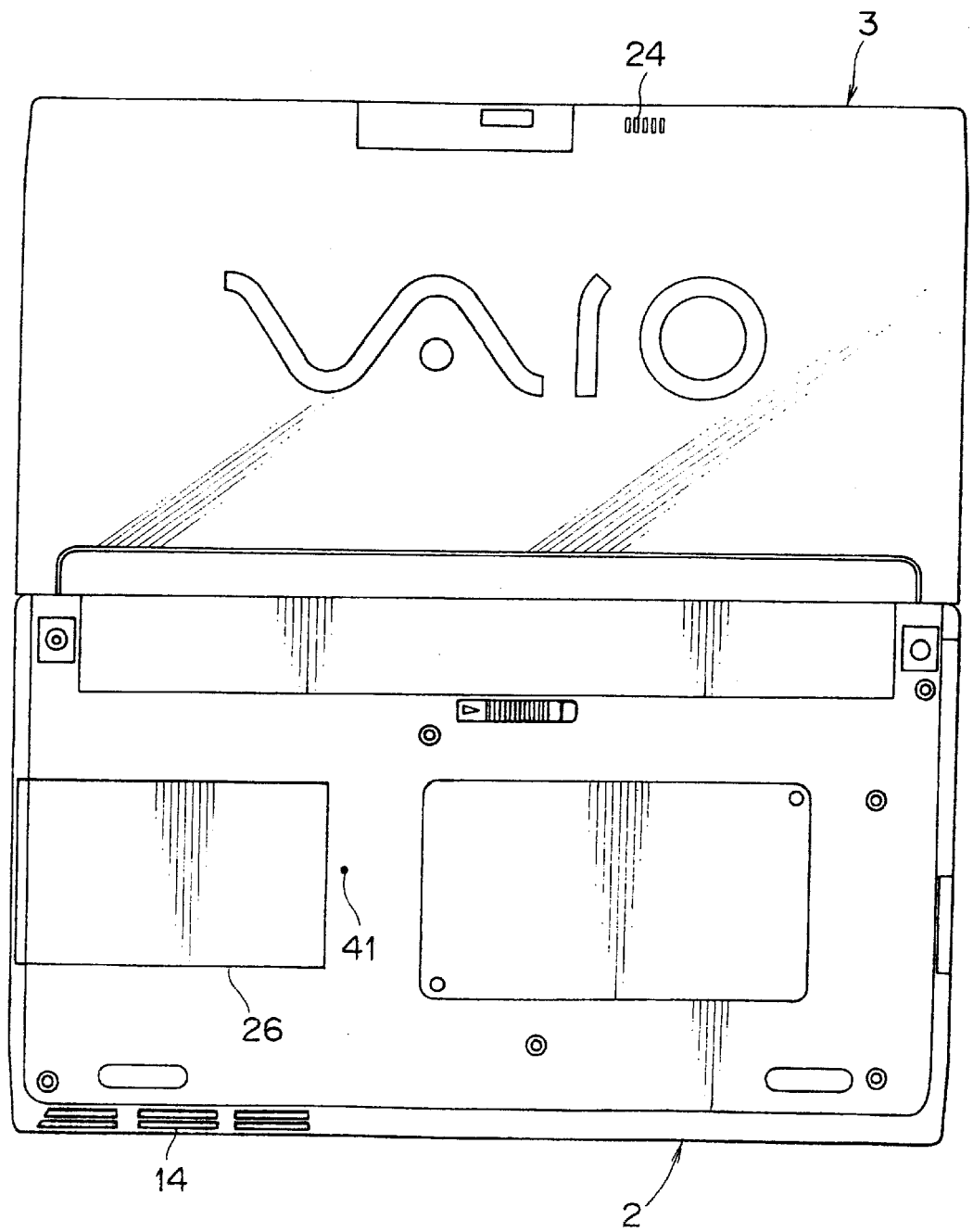
FIG. 8 is a bottom view of FIG. 3.

FIGS. 3 through 8 illustrate an exemplary configuration of a portable personal computer to which the present invention is applied. In the figures, the personal computer 1 is of mini-note type, which is basically composed of a body 2 and a display part 3 pivotally mounted thereon. FIG. 3 perspectively illustrates the personal computer 1 with the display part 3 opened relative to the body 2. FIG. 4 is a plan view of the personal computer 1 shown in FIG. 3. FIG. 5 is a left side view illustrating the personal computer 1 shown in FIG. 3 with the display part 2 closed on the body 2. FIG. 6 is a right side view illustrating the personal computer 1 shown in FIG. 3 with the display part 3 opened by 180 degrees relative to the body 2. FIG. 7 is a top view illustrating the personal computer 1 shown in FIG. 5. FIG. 8 is a bottom view illustrating the personal computer 1 shown in FIG. 6.

The body 2 is arranged on the top thereof with a keyboard 4 for operation to enter various characters and symbols and a Track Point (trademark) 5 for operation to move the mouse cursor for example. The body 2 is further arranged on the top thereof with a speaker 8 for outputting sound and a shutter button 10 for operation to pick up an image through a CCD video camera 23 disposed on the display part 3.

A pawl 13 is disposed on the upper end of the display part 3. A hole 6 in which the pawl 13 engages is disposed on the body 2 at a position that corresponds to the position of the pawl 13 when the display part 3 is closed on the body 2 as shown in FIG. 5. A slide lever 7 is disposed on the front face of the body 2 in a parallely movable manner along the front face. The slide lever 7 is adapted to latch and unlatch the pawl 13 engaged in the hole 6 for lock and unlock. In the unlocked state, the display part 3 can be pivotally moved relative to the body 2. A microphone 24 is disposed next to the pawl 13. As shown in FIG. 8, the microphone 24 can also pick up sound coming from the back of the personal microcomputer 1.

The front face of the body 2 is also disposed with a programmable power key (PPK) 9. On the right-side face of the body 2, an air outlet 11 is disposed as shown in FIG. 6. On the lower portion of the front face of the body 2, an air inlet 14 is disposed as shown in FIG. 7. To the right of the air outlet 11, a slot 12 is disposed for accommodating a PCMCIA (Personal Computer Memory Card International Association) card (a PC card in short).

On the top of the front face of the display part 3, an LCD (Liquid Crystal Display) 21 is disposed for displaying images. On the upper end of the display part 3, an image pickup part 22 is disposed in a pivotally movable manner relative to the display part 3. To be more specific, the image pickup part 22 can pivotally move to any position in a range of 180 degrees at right angles to the vertical direction of the display part 3. The image pickup part 22 has the CCD video camera 23.

In the lower portion of the display part 3, a power lamp PL, a battery lamp BL, a message lamp ML, and other lamp or lamps each constituted by an LED (Light Emitting Diode) are arranged, down close to the body 2. Reference numeral 40 shown in FIG. 5 denotes a power switch disposed on the left side face of the body 2. Reference numeral 25 shown in FIG. 7 denotes a focus adjusting ring for adjusting focus of the CCD video camera 23. Reference numeral 26 shown in FIG. 8 denotes a cover for an opening through which an add-on memory is installed in the body 2. Reference numeral 41 denotes a hole through which a pin is inserted to unlatch a claw locking the cover 26 to the body 2.

Figure 9:
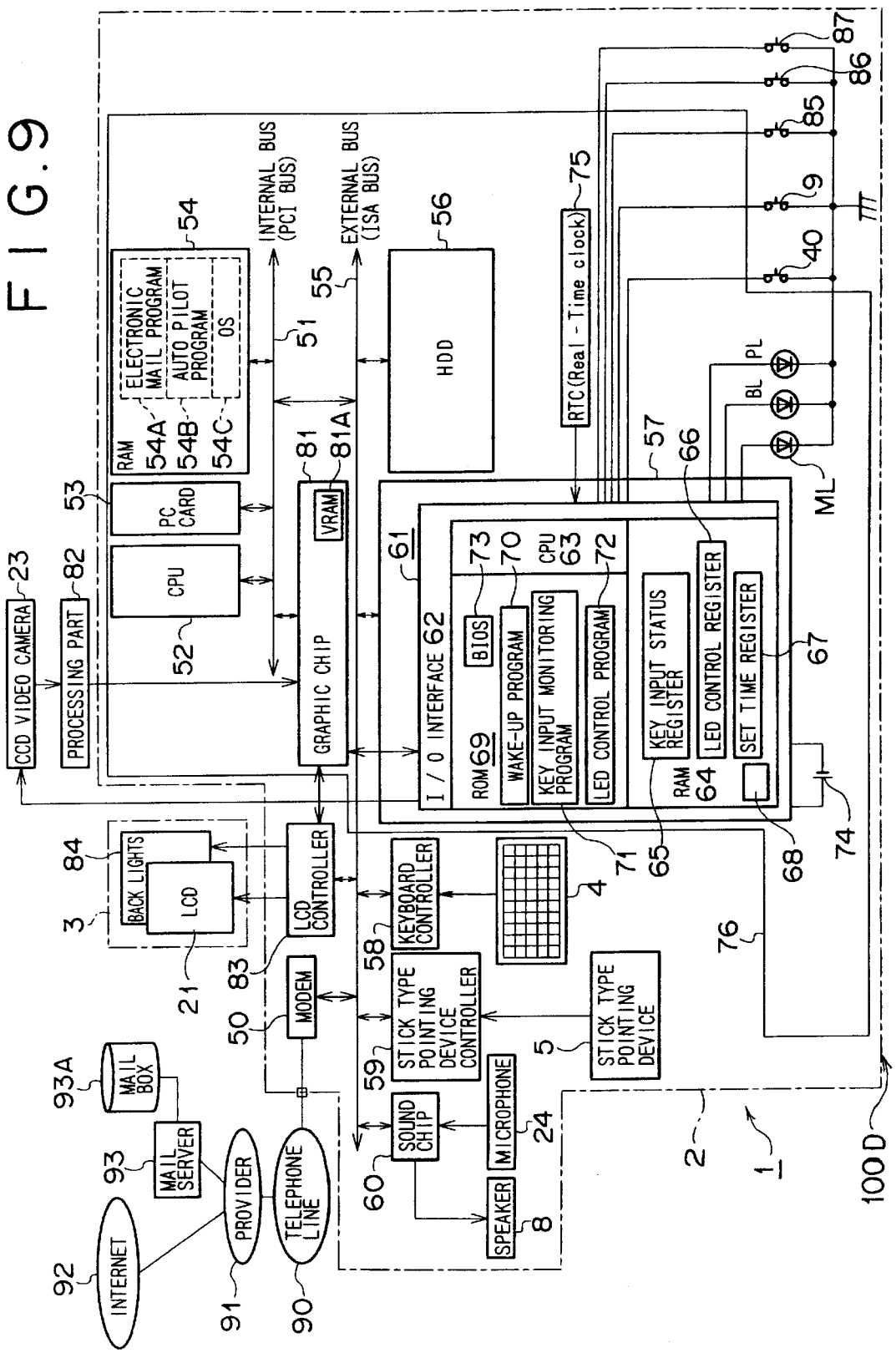
FIG. 9 is a block diagram illustrating an internal constitution of the personal computer shown in FIG. 1.

FIG. 9 exemplifies the internal constitution of the personal computer 1. As shown, an internal bus 51 is connected to a CPU (Central Processing Unit) 52, a PC card 53 to be inserted as required, a RAM (Random Access Memory) 54, and a graphics chip 81. The internal bus 51 is also connected to an external bus 55. The external bus 55 is connected to the hard disk drive (HDD) 56, an I/O (Input/Output) controller 57, a keyboard controller 58, a Track Point controller 59, a sound chip 60, an LCD controller 83, and a modem 50.

The CPU 52 controls each of the above-mentioned components of the personal computer 1. The PC card 53 is inserted to add an optional capability.

The graphics chip 81 is adapted to store the image data after being captured through the CCD video camera 23 and processed by a processing part 82. The graphics chip 81 stores the video data inputted from the CCD video camera 23 through the processing part 82 into an incorporated VRAM 81A and reads the stored video data from time to time to output it to the LCD controller 83. The LCD controller 83 outputs the image data supplied from the graphics chip 81 to the LCD 21 for display. The back light 84 is arranged to illuminate the LCD 21 from the back side.

The RAM 54 stores, when the personal computer 1 starts, an electronic mail program (an application program) 54A, an auto pilot program (an application program) 54B, and an OS (Operating System) 54C from the HDD 56, these are transferred from HDD 56 upon completing start-up.

The electronic mail program 54A handles electronic messages transferred from a network through a communication network like telephone line. The electronic mail program 54A has an in-coming mail capturing capability as a particular capability. The in-coming mail capturing capability checks a mail box 93A of a mail server 93 whether or not a mail addressed to that user has arrived, and if such a mail is found, captures the same.

The auto pilot program 54B sequentially starts plural preset processing (or programs) in a predetermined order.

The OS 54C controls basic computer operations exemplified by Windows 95 (trademark).

Figure 10:
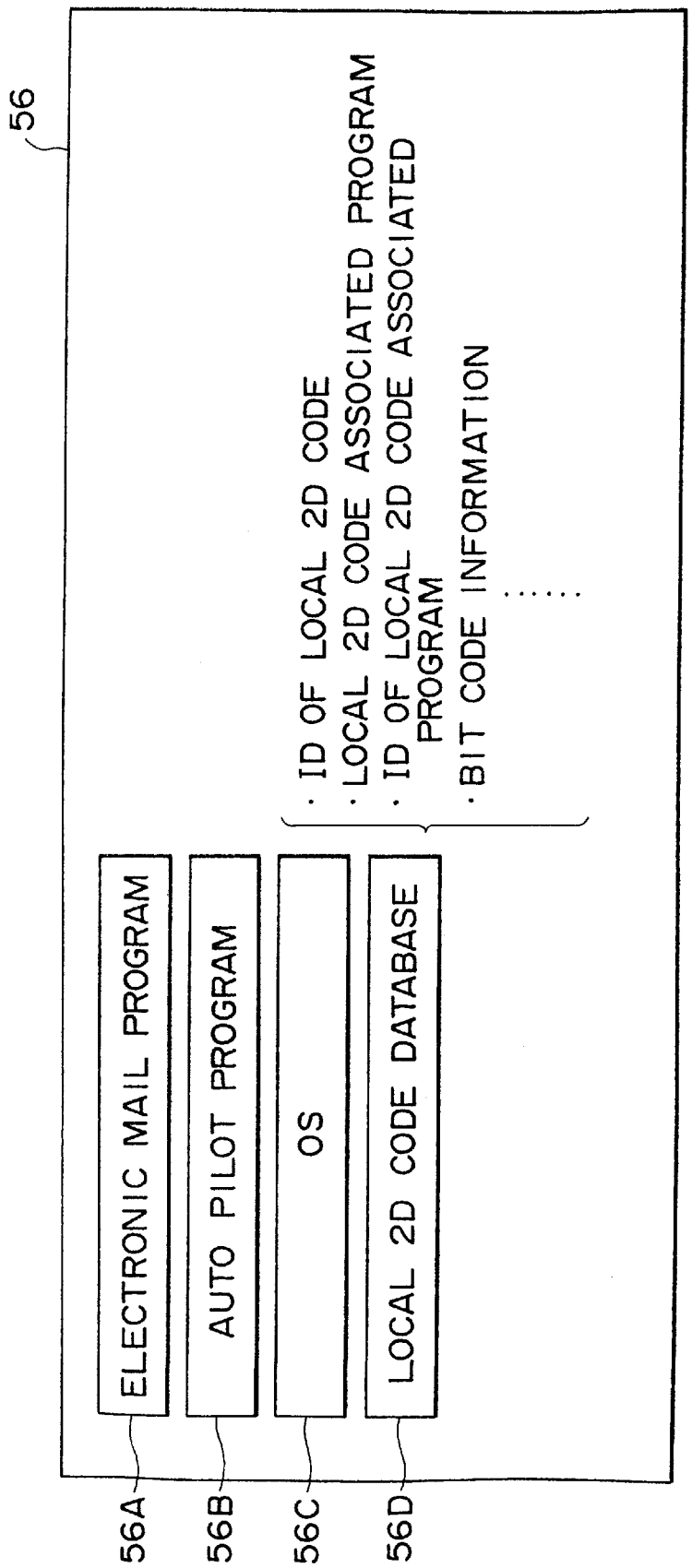
FIG. 10 is a diagram illustrating the configuration of a HDD shown in FIG. 9.

On the other hand, the HDD 56 on the external bus 55 stores an electronic mail program 56A, an auto pilot program 56B, an OS (Operating System) 56C, and the local 2D code database 56D as shown in FIG. 10.

The local 2D code database 56D stores the 2D code IDs of local 2D codes, the local 2D code associated program to be executed in correspondence thereto, the IDs of these programs, and the 2D code bit range information.

The I/O controller 57 has a microcontroller 61 provided with an I/O interface 62. The microcontroller 61 is constituted by the I/O interface 62, a CPU 63, a RAM 64, and a ROM (Read Only Memory) 69 interconnected with each other. The RAM 64 has a key input status register 65, an LED (Light Emitting Diode) control register 66, a set time register 67, and a register 68. The set time register 67 is used to start a start sequence controller 76 when a time (or a boot condition) set by user comes. The register 68 stores the correspondence between a preset operator key combination (start-up condition) and an application program to be started. When the user enters this operator key combination, the corresponding application program (for example, the electronic mail program) starts.

The key input status register 65 stores an operator key flag when the one-touch programmable power key (PPK) 9 is pressed. The LED control register 66 controls the turn-on/off of the message lamp ML that indicates the operating state of the application program (the electronic mail program) stored in the register 68. The user can set any desired time to the set time register 67.

It should be noted that a backup battery 74 is connected to the microcontroller 61, thereby preventing the values set to the registers 65, 66, and 67 from being cleared after the body 2 is powered off.

The ROM 69 in the microcontroller 61 stores a wake-up program 70, a key input monitoring program 71, and an LED control program 72 in advance. The ROM 69 is constructed of an EEPROM (Electrically Erasable and Programmable ROM (Read Only Memory)) for example. The EEPROM is known as a flash memory. An RTC (Real Time Clock) 75 for always counting current time is also connected to the microcontroller 61.

The wake-up program 70 stored in the ROM 69 checks, based on the current time data supplied from the RTC 75, whether the time preset to the set time register 67 has been reached. If the time is found reached, the wake-up program 70 starts a predetermined processing operation (or a program). The key input monitoring program 71 monitors the pressing of the PPK 9 by the user all the time. The LED control program 72 controls the turn-on/off of the message lamp ML.

The ROM 69 also stores a BIOS (Basic Input/Output System) 73. The BIOS is a software program for controlling the transfer (input/output) of data between the OS or an application program and peripheral devices (the display unit, the keyboard, and the hard disk drive).

The keyboard controller 58 connected to the external bus 55 controls the input made through the keyboard 4. The Track Point controller 59 controls the input made through the Track Point 5.

The sound chip 60 captures the input from the microphone 24 and supplies an audio signal to the built-in speaker 8.

The modem 50 connects the personal computer 1 to a communication network 92 such as the Internet or the mail server 93 through a public telephone line 90 or an Internet service provider 91.

The power switch 40 is operated for turning on/off the power to the personal computer 1. A half-push switch 85 is turned on when the shutter button 10 is pressed to the half position. A full-push switch 86 is turned on when the shutter button 10 is fully pressed. A reverse switch 87 is turned on when the image pickup part 22 is rotated 180 degrees (namely, when the CCD video camera 23 is rotated for image pick-up in the direction behind the LCD 21).

The terminals 400-1 through 400-N is basically the same in configuration as the personal computer 1. Therefore, they are omitted from the illustration and description.

Figure 11:
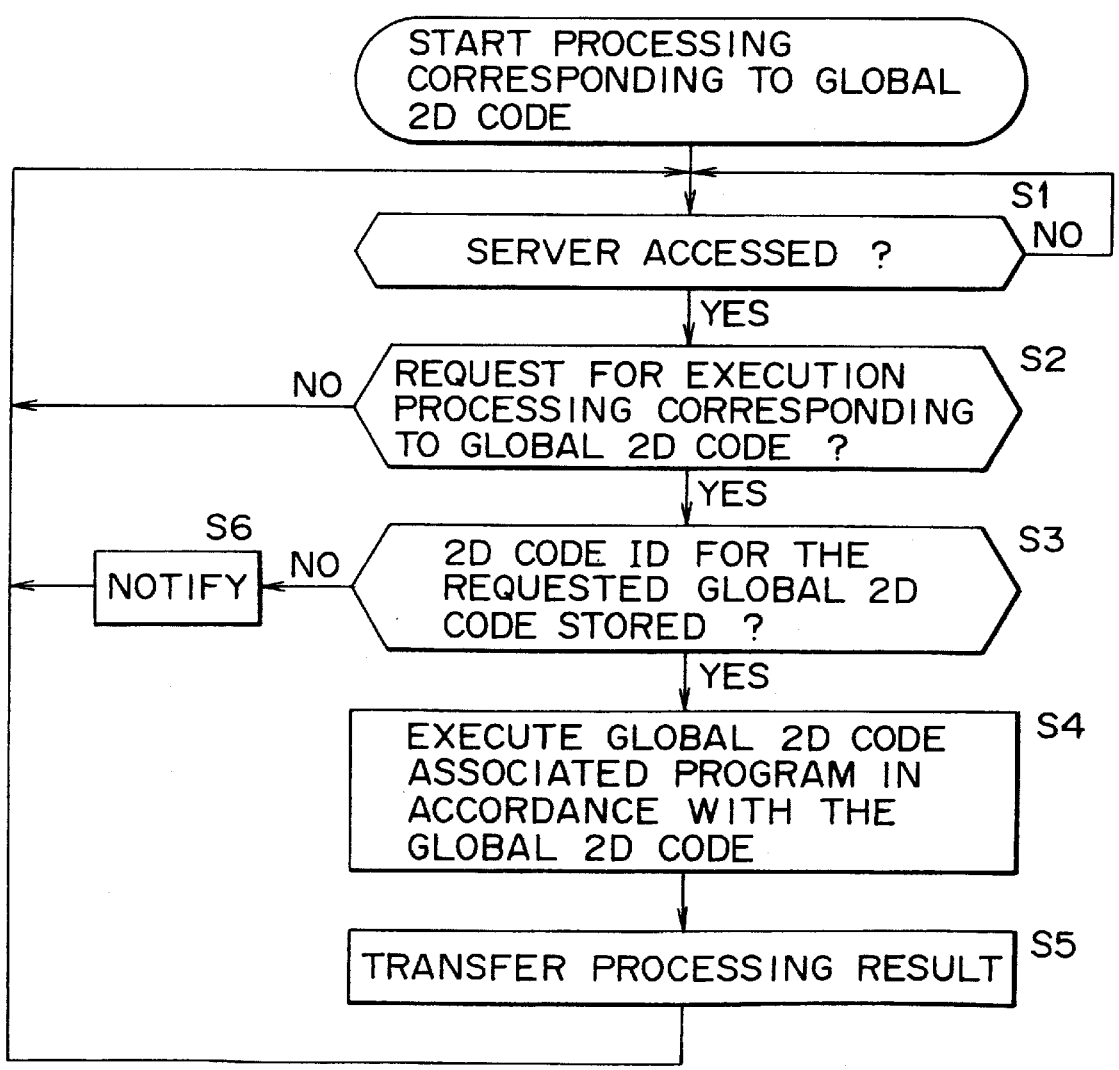
FIG. 11 is a flowchart describing the operation of a global 2D code server to be executed when the processing corresponding to a global 2D code is executed.

The following describes the procedure of the processing by the global 2D code server 300 for providing the global 2D code associated program, with reference to the flowchart shown in FIG. 11.

While the server program stored in the hard disk 314 of the global 2D code server 300 has been started, the CPU 311 waits, according to its server program, in step S1 until a packet addressed to the global 2D code server 300 is received by the network interface 317 (namely, until accessed by a device connected to the Internet 92).

When the packet addressed to the global 2D code server 300 is received, the CPU 311 determines in step S2 whether the packet is a request (command) for providing the global 2D code associated program. If the decision is made YES, the processing flow goes to step S3.

In step S3, the CPU 311 searches the hard disk 314 to check whether or not the 2D code ID of the global 2D code received in step SI is stored. If the decision is made YES, the CPU 311 searches the hard disk 314 in step S4 to read the program ID for that 2D code ID and executes the global 2D code associated program of that program ID.

Next, in step S5, the CPU 311 controls the network interface 317 to send the result of the processing executed in step S4 to the device that sent the command. After executing the processing for the global 2D code, the processing flow goes back to step Si, in which the CPU 311 is kept in the standby state until the server is accessed again.

If the received packet is found that it is not a predetermined execution request corresponding to the global 2D code in step S2, the processing flow returns to step SI.

In step S3, if the CPU 311 determines that the 2d code ID of the global 2D code is not stored in the hard disk 314, then the CPU 311 controls the network interface 317 in step S6 to notify the command issuing device of the fact that the 2D code ID is not stored, upon which the processing flow returns to step SI.

Thus, the global 2D code server 300 executes the global 2D code associated program according to the contents of the packet (the command) received over the Internet 92 and sends the processing result to the device that sent the packet.

Figure 12:
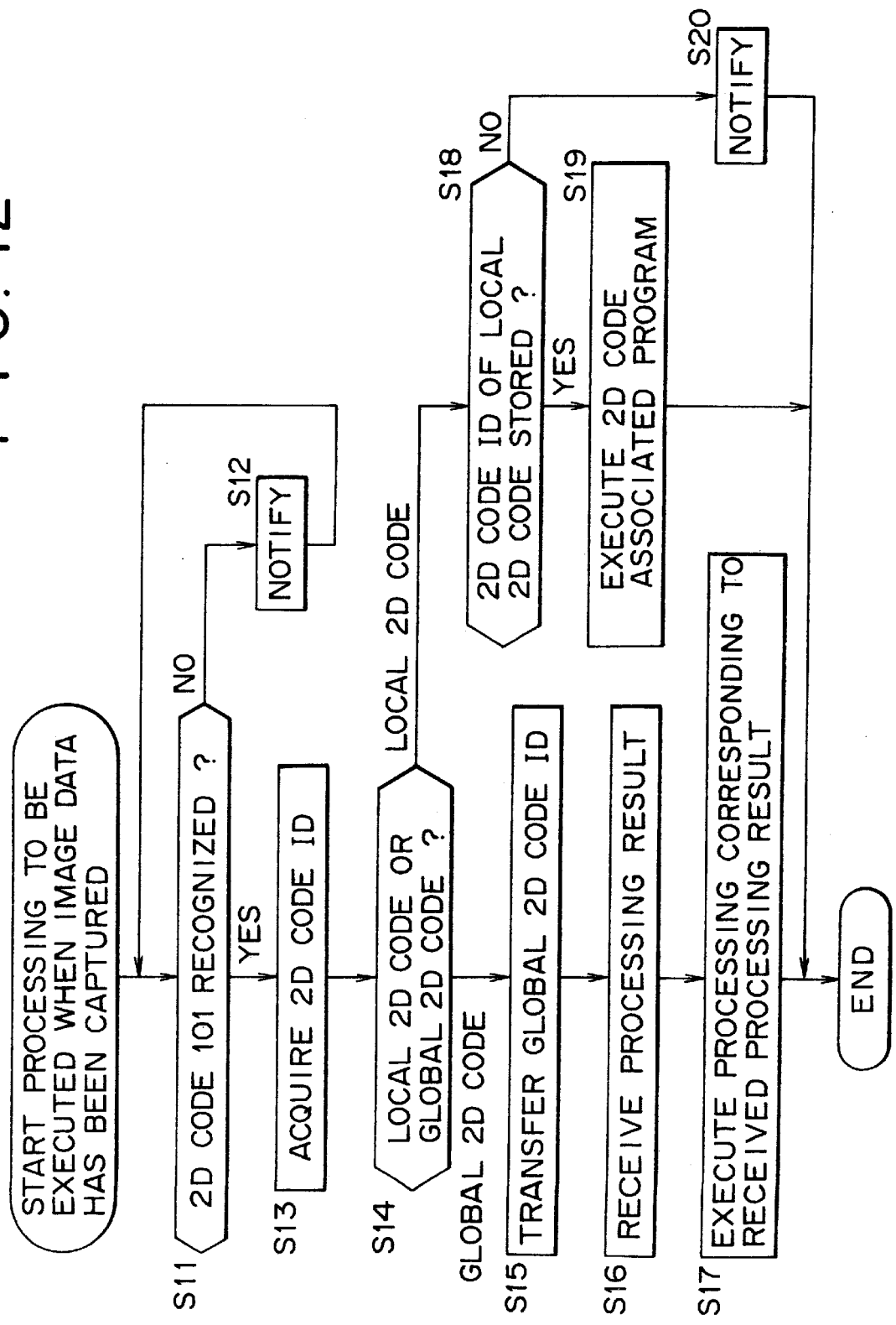
FIG. 12 is a flowchart describing the operation of a CPU of the personal computer to be executed when image data has been captured.

The following describes the procedure of the processing to be executed by the CPU 52 of the personal computer 1 when image data is captured, with reference to the flowchart shown in FIG. 12.

For example, assume that the shutter button 10 is operated, the image data of the 2D code 101 is acquired through the CCD video camera 23, and the captured image is drawn in the VRAM 81A of the graphics chip 81. Then, in step S11, the CPU 52 extracts the image data of the 2D code 101 from the image data drawn in the VRAM 81A and executes the processing for recognizing the 2D code 101. If the CPU 52 fails to recognize the 2D code 101, then the CPU 52 controls the LCD controller 83 in step S12 to display the failure on the LCD 21, prompting the user for retry. Then, the processing flow returns to step S11. If the recognition of the 2D code 101 is successful, the processing flow goes to step S13.

In step S13, the CPU 52 analyzes the code pattern of the 2D code 101 recognized in step S11 to acquire the 2D code ID. Next, in step S14, the CPU 52 determines whether the 2D code ID obtained in step S13 is of a local 2D code or a global 2D code, based on the 2D code bit range information stored in the local 2D code database 56D. Namely, if the CPU 52 determines that the 2D code ID obtained in step S13 is a value within the range of 0x000000through 0x0FFFFF, the 2D code ID is of a local 2D code; if the 2D code ID is a value within the range of 0x100000through 0xFFFFFF, the 2D code is of a global 2D code.

In step S14, if the 2D code ID is found of a global 2D code, then, the CPU 52 controls the modem 50 in step S15 to start connection with the provider 91 and sends the 2D code ID obtained in step S13 to the global 2D code server 300 and, at the same time generates the IP packet of the command for requesting the execution of the processing corresponding to the global 2D code and transfers the IP packet to the 2D code server 300.

In step S16, the CPU 52 receives the processing result sent from the global 2D code server 300 through the modem 50 in response to the command transferred in step S15. In step S17, the CPU 52 executes the processing according to the processing result received in step S16. Then, the processing comes to an end.

In step S14, if the CPU 52 determines that the 2D code ID obtained in step S13 is of a local 2D code, the processing flow goes to step S18. In step S18, the CPU 52 searches the local 2D code database 56D whether or not the 2D code ID obtained in step S13 is stored therein. If the 2D code ID is found, the processing flow goes to step S19, in which the CPU 52 further searches the local 2D code database 56D and executes the local 2D code associated program corresponding to the local 2D code thus found. Then, the processing comes to an end.

In step S18, if the CPU 52 determines that the 2D code ID is not stored in the local 2D code database 56D, the processing flow goes to step S20, in which the CPU 52 controls the LCD controller 83 to display on the LCD 21 the fact that the 2D code ID is not stored. Then, the processing comes to an end.

The following describes more specifically the processing procedure of the CPU 52 of the personal computer 1 to be executed when the image data mentioned above has been captured.

For example, assume that the 2D code 101 is a global 2D code and the global 2D code associated program to be executed corresponding to this code is a new year's card creating program for generating a predetermined new year's card image. Namely, assume that the 2D code ID of the 2D code 101 and the ID of the new year's card creating program are stored together in the hard disk 314 of the global 2D code server 300.

When user C of the terminal 400-1 provides a printed matter of the 2D code 101 to user D of the personal computer 1, and user D uses the CCD video camera 23 of the personal computer 1 to read the provided printed matter of the 2D code 101, the CPU 52 of the personal computer 1 executes the processing for recognizing the 2D code 101 (step S11 of FIG. 12) and, after recognizing the 2D code 101, acquires the ID of the 2D code (step S13 of FIG. 12).

Next, based on the obtained 2D code ID of the 2D code 101, if the CPU 52 determines that the 2D code 101 is of a global 2D code (step S14 of FIG. 12), the CPU 52 forms the 2D code ID of the 2D code 101 and a command for requesting predetermined processing for the global 2D code together into an IP packet and sends the same to the global 2D code server 300 through the modem 50 (step S15 of FIG. 12).

The CPU 311 of the global 2D code server 300 receives the packet through the network interface 317 (step S1 of FIG. 11) and determines that the received packet is the command for requesting the processing corresponding to the global 2D code (step S2 of FIG. 11).

Next, the CPU 311 of the global 2D code server 300 searches the hard disk 314 for the global 2D code associated program corresponding to the received 2D code ID and executes the program, namely the new year's card creating program (step S4 of FIG. 11). When the new year's card program is executed, an image of a predetermined new year's card format is generated. The CPU 311 sends the generated image data to the personal computer 1 through the network interface 317 (step S5 of FIG. 11).

The CPU 52 of the personal computer 1 controls the modem 50 to receive the image data sent from the global 2D code server 300 (step S16 of FIG. 12) and controls the LCD controller to display the received image data on the LCD 21 (step S17 of FIG. 12).

Thus, user D of the personal computer 1 is given the same effect as if she/he has received a new year's card from user C by using the personal computer 1 to read the printed matter of the 2D code 101 received from user C. It should be noted that, because user C is a subscriber of the 2D code processing system, the registered name and address of user C are displayed on the new year's card.

Figure 13:
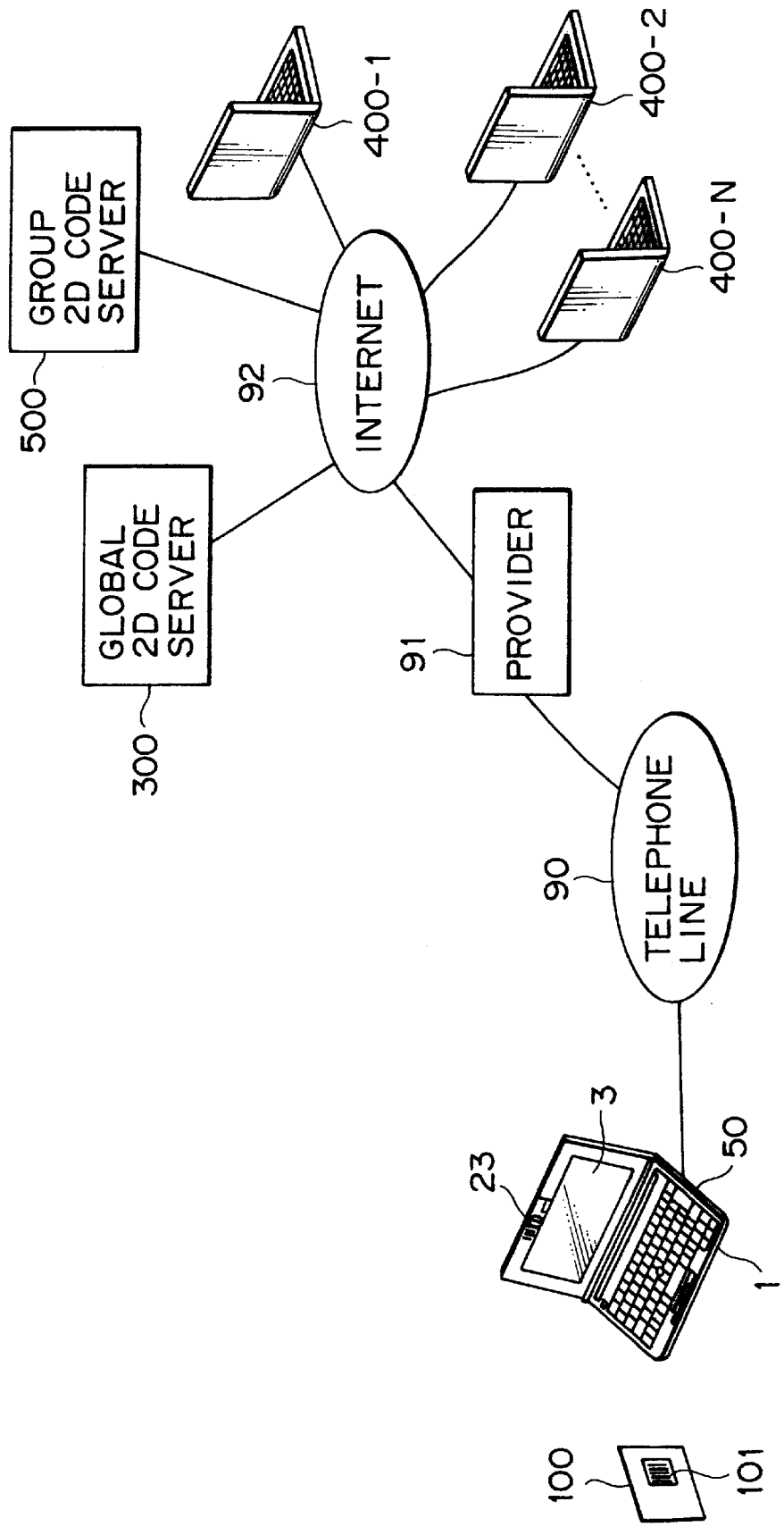
FIG. 13 is a schematic diagram illustrating a 2D code processing system practiced as second embodiment of the present invention.

FIG. 13 is a schematic diagram illustrating the 2D code processing system practiced as a second embodiment of the invention. It should be noted that, with reference to FIG. 13, components similar to those previously described with FIG. 1 are denoted by the same reference numerals. In this example, a group 2D code database server (hereafter referred to as a group 2D code server) 500 is newly connected to the Internet 92.

The group 2D code server 500 stores the 2D code IDs of those 2D codes which have been set as group 2D codes and executes predetermined processing corresponding to these group 2D codes.

The 2D code ID of each group 2D code is assigned with the bit code in the range assigned to the 2D code ID of each local 2D code. In this example, for instance, the value of the group 2D code ID is a value within the range of 0x000000through 0x00FFFF, and the value of the local 2D code ID is within the range of 0x100000through 0FFFFF. It should be noted that the value of the 2D code ID of each global 2D code is within the range of 0x100000through 0xFFFFFF.

Only the terminals in one group, in this example the personal computer 1, the terminal 400-1 and the terminal 400-2 are allowed to access the group 2D code server 500, each storing the 2D code bit range information as described above. It should be noted that the personal computer 1, the terminal 400-1, and the terminal 400-2 are notified of the URL of the group 2D code server 500.

Figure 14:
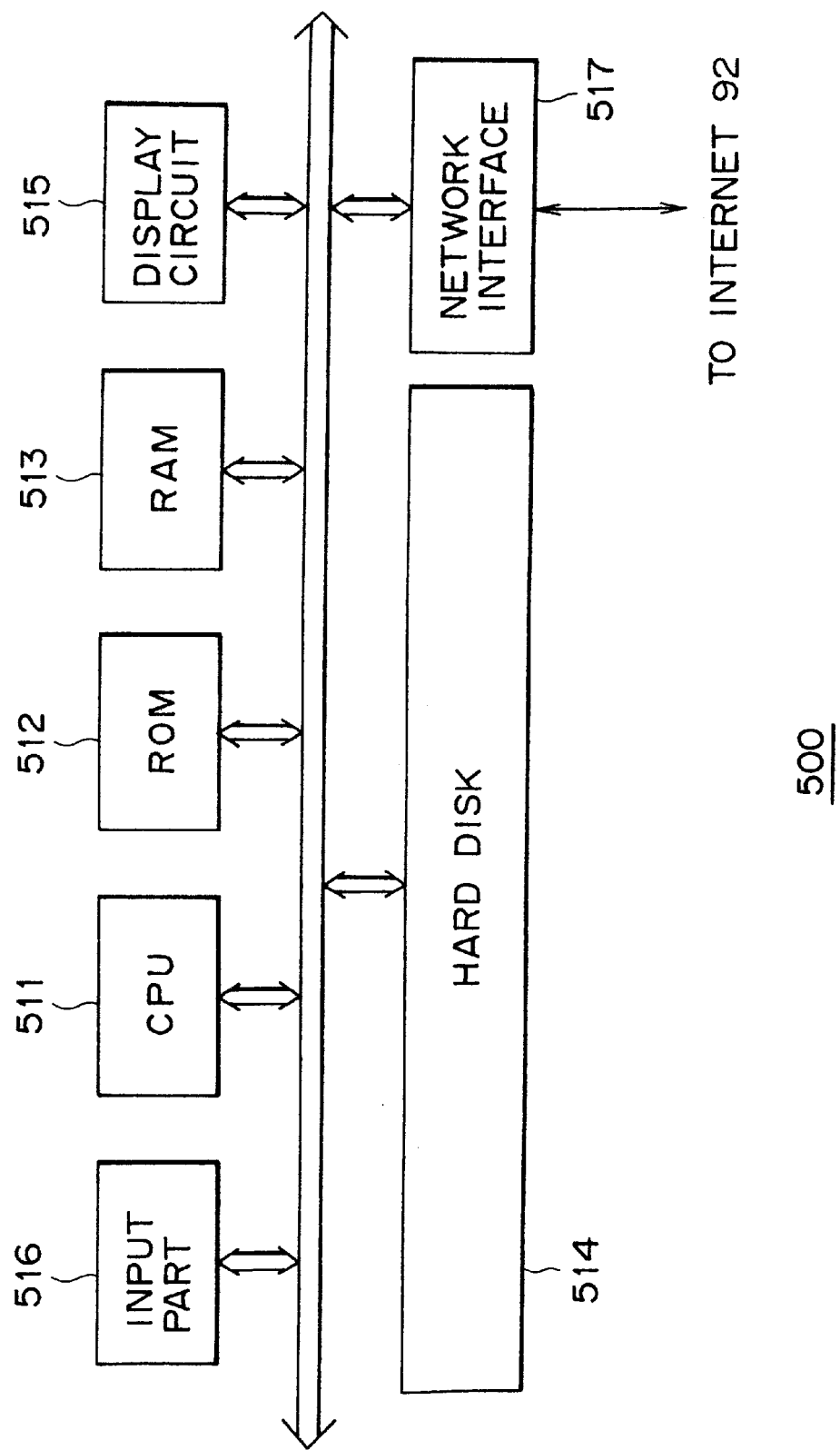
FIG. 14 is a block diagram illustrating an exemplary configuration of a group 2D code server shown in FIG. 13.

FIG. 14 is a block diagram illustrating an exemplary configuration of the group 2D code server 500. A CPU 511 through a network interface 517 are generally the same in configuration as the CPU 311 of the global 2D code server 300 through the network interface 317 shown in FIG. 2 and therefore details will not be described hereunder. A hard disk 514 stores a server program, group 2D code associated programs to be executed in association with group 2D codes, the 2D code IDs of the group 2D codes, and the IDs of the group 2D code associated programs.

The operation of the group 2D code server 500 for executing the processing for group 2D codes is basically the same with the operation of the global 2D code server 300 for executing the processing for global 2D codes. Therefore, the operation of the group 2D code server 500 will not be described in detail.

Figure 15:
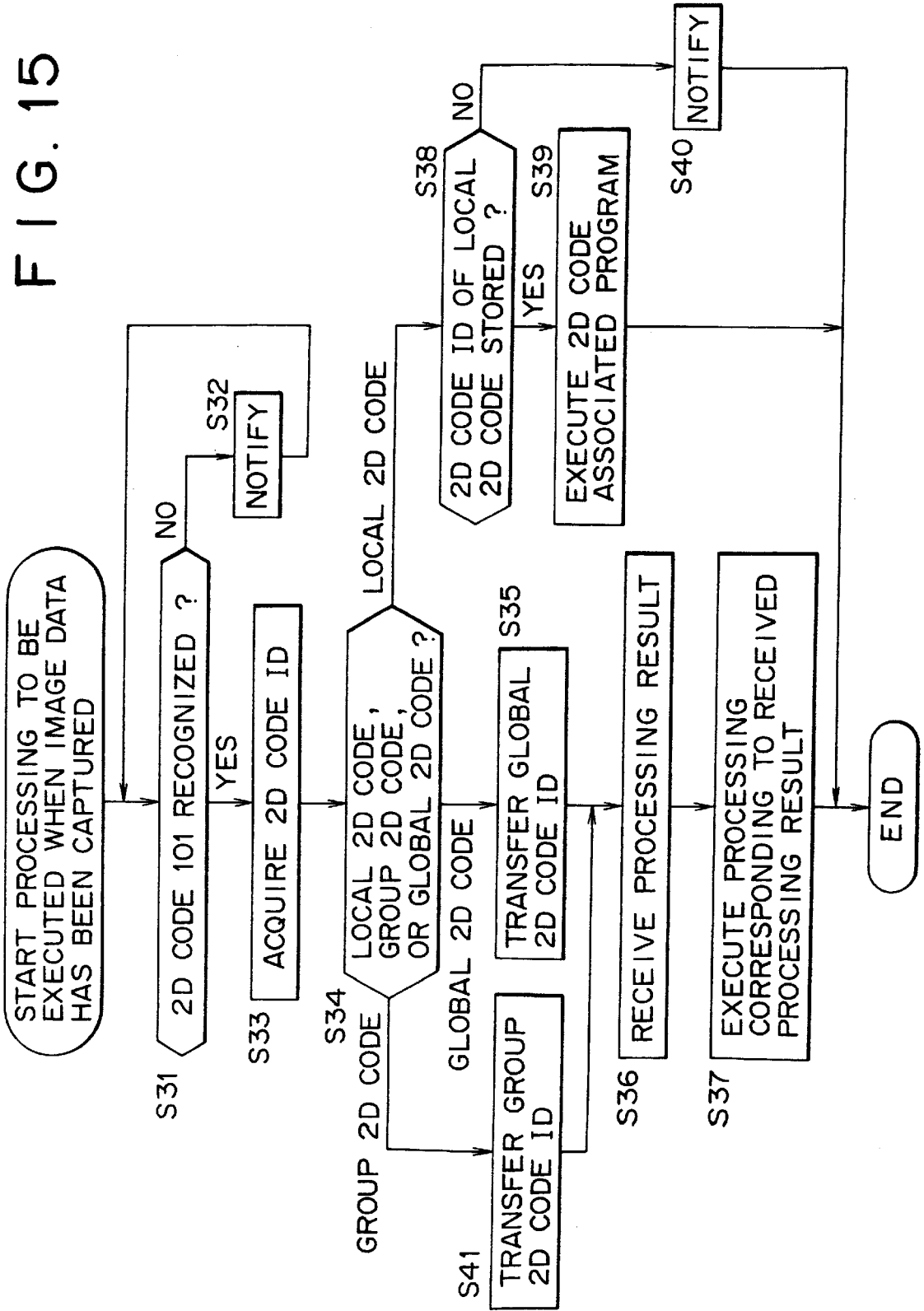
FIG. 15 is a flowchart describing the operation of the CPU of the personal computer to be executed when image data has been captured.
Figure 16:
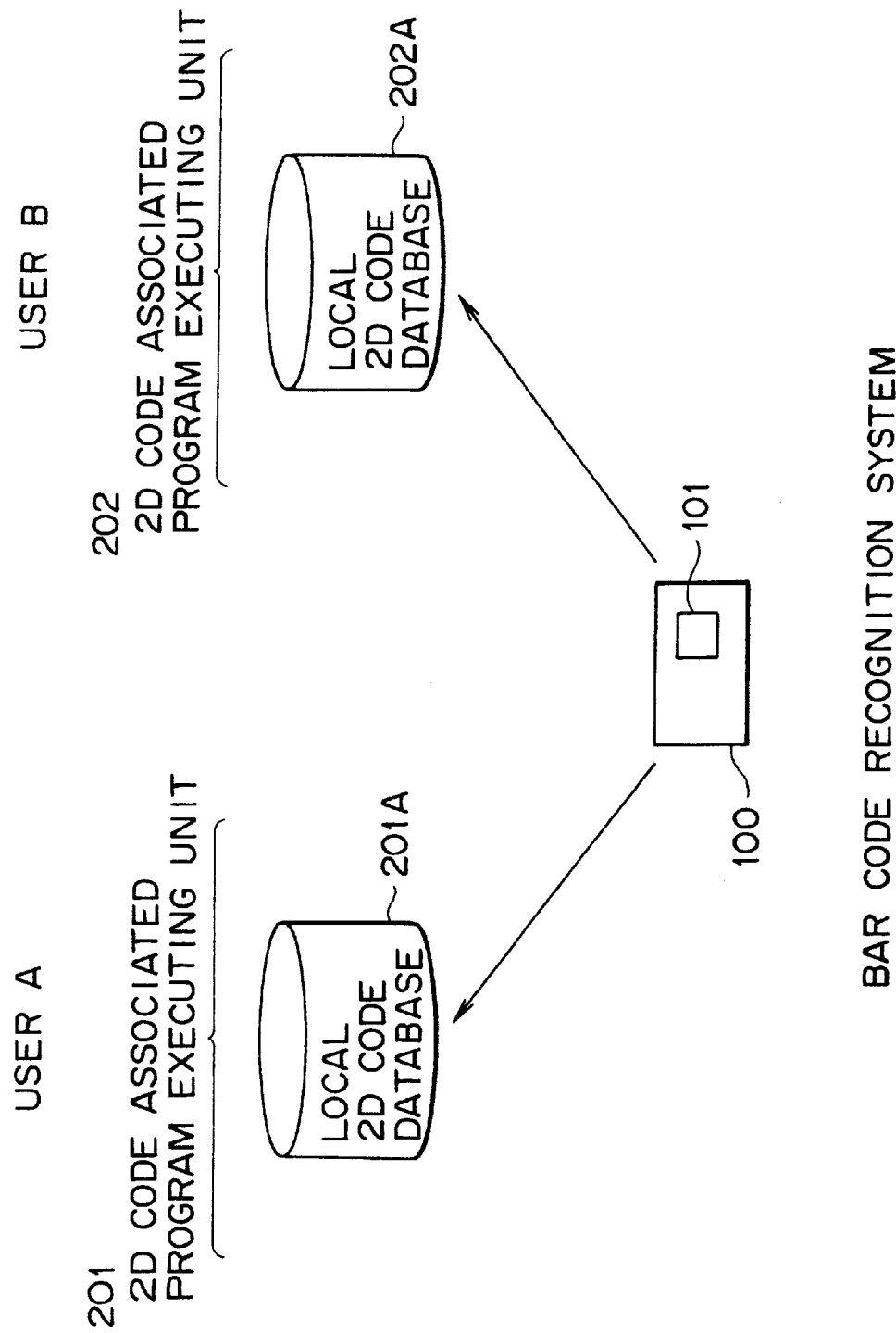
FIG. 16 is a schematic diagram illustrating a related art two-dimensional bar code processing system.
Figure 17:
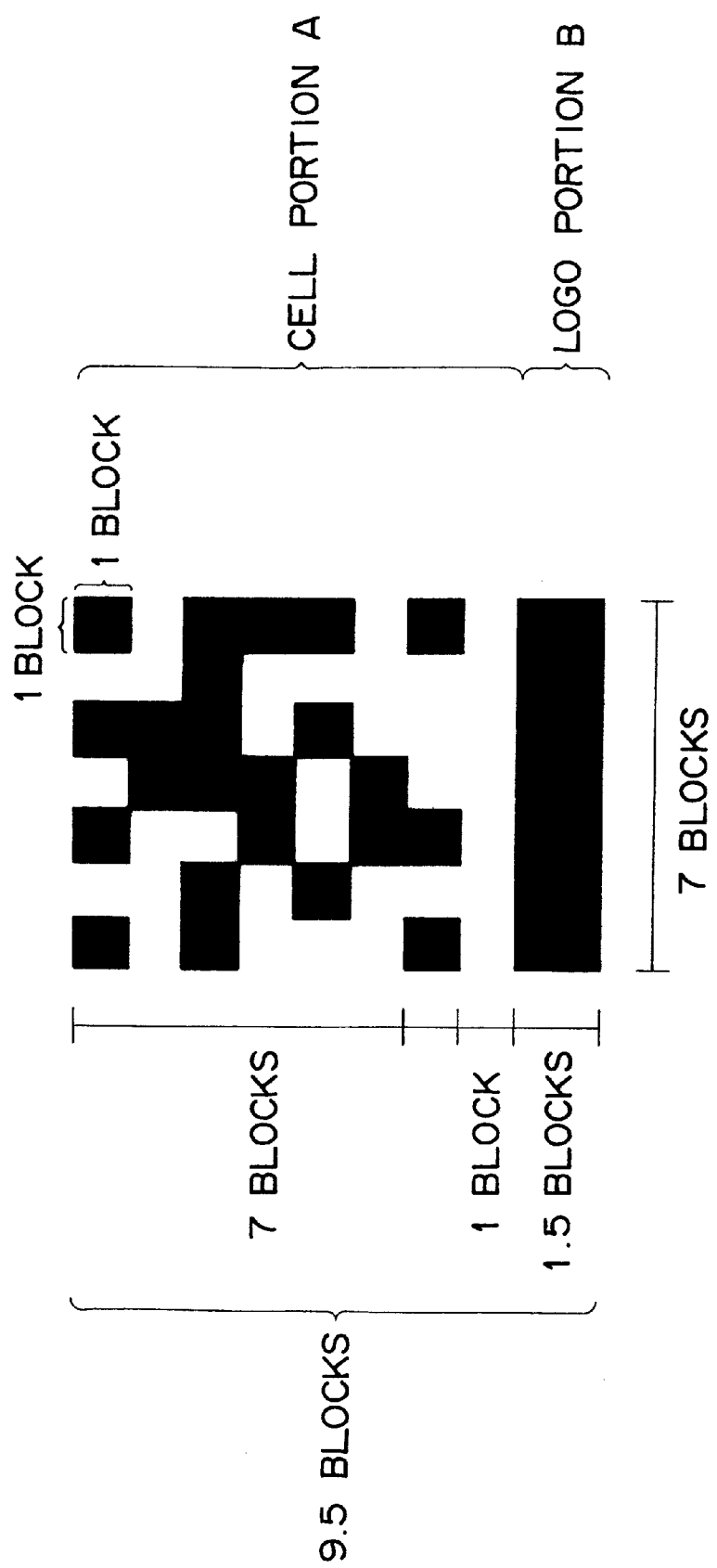
FIG. 17 is a diagram illustrating the specifications of a two-dimensional bar code.

The following describes the processing procedure of the CPU 52 of the personal computer 1 to be executed when image data has been read, with reference to the flowchart shown in FIG. 15.

In steps S31 through S40, the same processing as those in steps S11 through S20 of FIG. 12 are executed. Therefore, the processing operations in steps S31 through S40 will not be described in detail.

In step S34, if the CPU 52 determines, based on the 2D code ID obtained in step S33, that the 2D code 101 recognized in step S31 is a group 2D code, namely the value of the 2D code ID is within the range of 0x000000 through 0x00FFFF, the processing flow goes to step S41. In step S41, the CPU 52 controls the modem 50 and transfers the 2D code ID obtained in step S33 to the group 2D code server 500, and generates the IP packet of the command for requesting the processing for the group 2D code and sends the generated IP packet to the group 2D code server 500.

Next, in step S36, the CPU 52 receives, from the group 2D code server 500, the result of the processing executed in response to the command transferred in step S41. Then, the CPU 52 executes the processing in response to the processing result received in step S36 and the processing comes to an end.

FIGS. 18 through 21 shows configurations of the 2D code processing system in the second embodiment of the present invention. In this embodiment, therefore, parts corresponding to those in the first embodiment are designated by the same reference numerals as those in the first embodiment, and the detailed explanation thereof is omitted.

Figure 18:
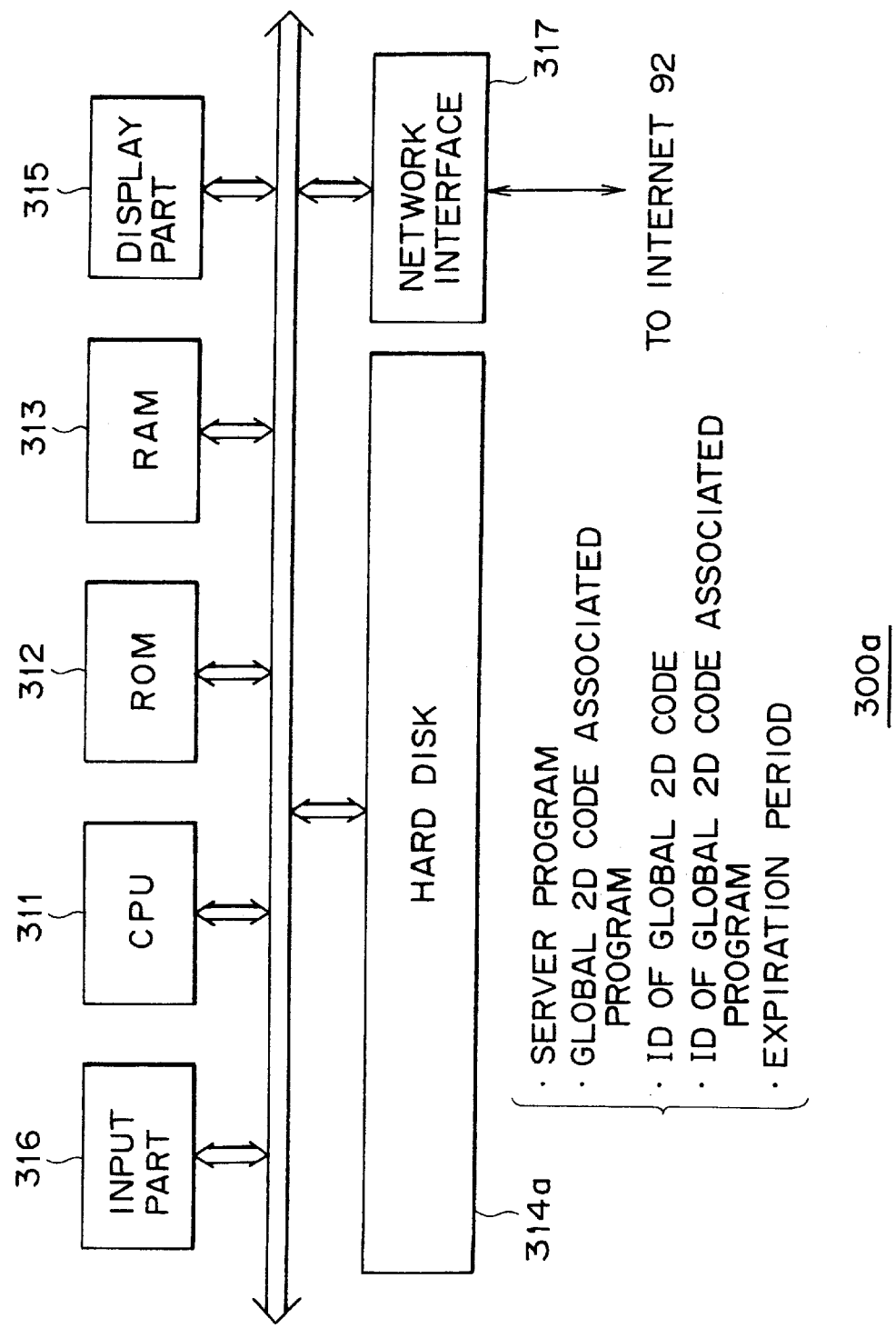
FIG. 18 is a block diagram illustrating an example of the configuration of the global 2D code server in FIG.

FIG. 18 is a block diagram illustrating an example of the configuration of the global 2D code server 300a.

The hard disk 314a stores a server program, a global 2D code associated program to be executed in association with the global 2D code, and the expiration period of the program, in addition to the 2D code ID for the global 2D code and the ID of the global 2D code associated program corresponding thereto. It should be noted that the expiration period of the global 2D code associated program is set in calendar date or time for example.

Figure 19:
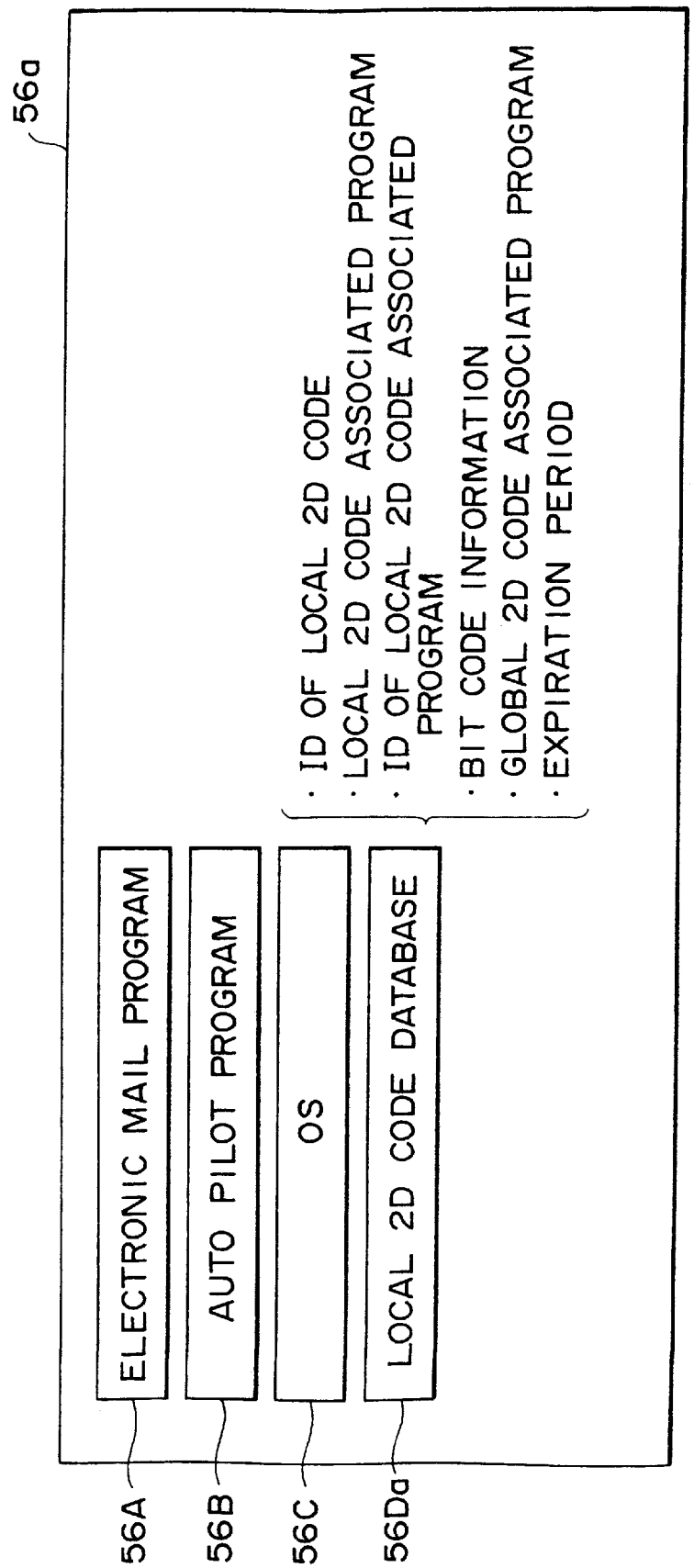
FIG. 19 is a diagram illustrating the configuration of a HDD shown in FIG. 18.

On the other hand, the HDD 56a in the personal computer 1 as shown in FIG. 9 stores an electronic mail program 56A, an auto pilot program 56B, an OS (Operating System) 56C, and the local 2D code database 56Da as shown in FIG. 19.

The local 2D code database 56Da stores the 2D code IDs of local 2D codes, the local 2D code associated program to be executed in correspondence thereto, the IDs of these programs, and the 2D code bit range information. When a predetermined global 2D code is registered through a predetermined procedure, the 2D code ID of that global 2D code, the global 2D code associated program to be executed in correspondence to the global 2D code, the ID of that program, and the expiration period thereof are stored in the local 2D code database 56Da.

Figure 20:
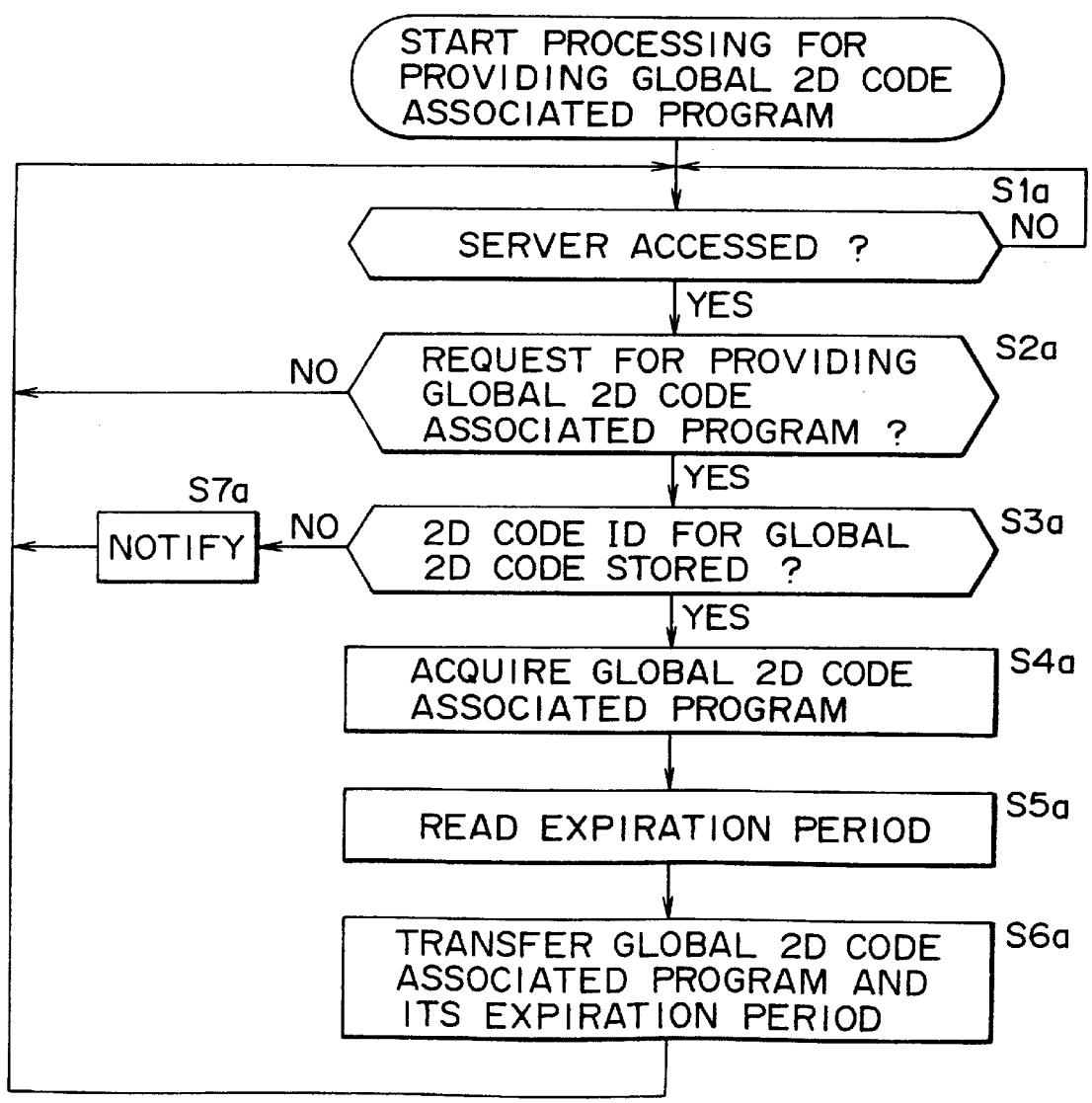
FIG. 20 is a flowchart describing the operation of a global 2D code server to be executed when the processing corresponding to a global 2D code is executed.

The following describes the procedure of the processing by the global 2D code server 300a for providing the global 2D code associated program, with reference to the flowchart shown in FIG. 20.

While the server program stored in the hard disk 314a of the global 2D code server 300a has been started, the CPU 311 waits, according to its server program, in step S1a until a packet addressed to the global 2D code server 300a is received by the network interface 317 (namely, until accessed by a device connected to the Internet 92).

When the packet addressed to the global 2D code server 300a is received, the CPU 311 determines in step S2a whether the packet is a request (command) for providing the global 2D code associated program. If the decision is made YES, the processing flow goes to step S3a.

In step S3a, the CPU 311 searches the hard disk 314a to check whether or not the 2D code ID of the global 2D code received in step S1a is stored. If the decision is made YES, the CPU 311 goes to step S4a.

In step S4a, the CPU 311 further searches the hard disk 314a to read the program ID corresponding to that 2D code ID and acquires the global 2D code associated program corresponding to that program ID. Next, in step S5a, the CPU 311 searches the hard disk 314a again to read the expiration period of the global 2D code associated program acquired in step S4a.

In step S6a, the CPU 311 controls the network interface 317 to send the global 2D code associated program acquired in step S4a and the expiration period of the program read in step S5a to the device that sent the command. Then, the processing flows returns to step S1a in which the CPU 311 waits until being accessed.

In step S2a, if the received packet is not of the request for providing a global 2D code associated program, the processing flow returns to step S1a.

In step S3a, if the CPU 311 determines that the 2D code ID of the global 2D code is not stored in the hard disk 314a, then, in step S7a, the CPU 311 controls the network interface 317 to notify the command sending device thereof. Then, the processing flow returns to step S1a.

Thus, the global 2D code server 300a sends, to the device that sent the packet (the command) through the Internet 92, the global 2D code associated program corresponding to that packet and the expiration period of that program.

The following describes the procedure of the processing to be executed by the CPU 52 of the personal computer 1 when image data is captured, with reference to the flowchart shown in FIG. 21.

For example, assume that the shutter button 10 is operated, the image data of the 2D code 101 is captured through the CCD video camera 23, and the captured image is drawn in the VRAM 81A of the graphics chip 81. Then, in step S11a, the CPU 52 extracts the image data of the 2D code 101 from the image data drawn in the VRAM 81A and executes the processing for recognizing the 2D code 101. If the CPU 52 fails to recognize the 2D code 101, then the CPU 52 controls the LCD controller 83 in step S12a to display the failure on the LCD 21, prompting the user for retry. Then, the processing flow returns to step S11a. If the recognition of the 2D code 101 is successful, the processing flow goes to step S13a.

In step S13a, the CPU 52 analyzes the code pattern of the 2D code 101 recognized in step S11a to acquire the 2D code ID. Next, in step S14a, the CPU 52 determines whether the 2D code ID obtained in step S13a is of a local 2D code or a global 2D code, based on the 2D code bit range information stored in the local 2D code database 56Da. Namely, if the CPU 52 determines that the 2D code ID obtained in step S13a is a value within the range of 0x000000 through 0x0FFFFF, the 2D code ID is of a local 2D code; if the 2D code ID is a value within the range of 0x100000 through 0xFFFFFF, the 2D code is of a global 2D code.

In step S14a, if the 2D code ID is found of a global 2D code ID, then in step S15a, the CPU 52 determines whether or not the 2D code ID is stored (registered) in the local 2D code database 56Da. If the 2D code ID is not found in the database, the processing flow goes to step S16a.

In step S16a, the CPU 52 controls the modem 50 to start connection with the provider 91 and sends the 2D code ID acquired in step S13a to the global 2D code server 306a and generates the IP packet of the command for requesting the provision of the global 2D code associated program to be executed for the global 2D code and sends the generated IP packet to the global 2D code server.

Next, in step S17a, the CPU 52 receives the global 2D code associated program and its expiration period transferred from the global 2D code server 300a in response to the command transferred in step S16a and registers them in step S18a. Thus, the local 2D code database 56Da stores the 2D code ID of the global 2D code, the global 2D code associated program to be executed correspondingly thereto, and its expiration period.

In step S19a, the CPU 52 executes the global 2D code associated program registered in step S18a. Then, the processing comes to an end.

In step S15a, if the 2D code ID is found in the local 2D code database 56Da, then, in step S20a, the CPU 52 searches the local 2D code database 56Da to read the expiration period of the global 2D code associated program to be executed in correspondence to the 2D code ID, check the contents of the expiration period, and determine whether or not the expiration period is valid, namely the expiration period has expired or not. If the expiration period is found expiring, then, back in step S16a, the processing of step S16a through step S19a are executed. Namely, the personal computer 1 receives the global 2D code associated program with the expiration period updated supplied from the global 2D code server 300a.

In step S20a, if the expiration period is found not expiring, the CPU 52 skips step S16a through step S18a to step S19a, in which the CPU 52 executes the registered global 2D code associated program.

In step S14a, if the 2D code ID is found of a local 2D code, then the CPU 52 searches the local 2D code database 56Da in step S21a to determine whether or not the 2D code ID acquired in step S13a is stored. If the 2D code ID is found stored, then in step S22a, the CPU 52 further searches the local 2D code database 56Da and executes the local 2D code associated program corresponding to that local 2D code. Then, the processing comes to an end.

In step S20a, if the CPU 52 determines that the 2D code ID is not stored in the local 2D code database 56Da, the processing flow goes to step S23a, in which the CPU 52 controls the LCD controller 83 to display on the LCD 21 the fact that the 2D code ID is not stored. Then, the processing comes to an end.

The following describes more specifically the processing procedure of the CPU 52 of the personal computer 1 to be executed when the image data mentioned above has been captured.

For example, assume that the 2D code 101 is a global 2D code and the global 2D code associated program to be executed corresponding to this code is a program for providing current weather forecast information, for example a program for providing a weather chart (hereafter referred to as a weather forecast program). In this example, assume that this weather forecast program is not registered in the personal computer 1, namely, is not stored in the local 2D code database 56Da in the HDD 56a.

For example, when the image data of the 2D code 101 is captured through the CCD video camera 23, the CPU 52 of the personal computer 1 executes the processing for recognizing the 2D code 101 (step S11a of FIG. 21) and, after recognizing the 2D code 101, acquires the ID of the 2D code (step S13a of FIG. 21).

Next, based on the acquired 2D code ID of the 2D code 101, if the CPU 52 determines that the 2D code 101 is of a global 2D code (step S14a of FIG. 21) and it is not stored in the local 2D code database 56Da (step S15a of FIG. 21), the CPU 52 forms the 2D code ID of the 2D code 101 and a command for requesting the provision of the global 2D code program to be executed correspondingly together into an IP packet and sends the same to the global 2D code server 300a through the modem 50 (step S16a of FIG. 21).

The CPU 311 of the global 2D code server 300a receives the packet through the network interface 317 (step S1a of FIG. 20) and determines that the received packet is the command for requesting the provision of the global 2D code associated program (step S2a of FIG. 20).

Next, the CPU 311 of the global 2D code server 300a searches the hard disk 314a. If the code is found stored (step S3a of FIG. 20), the CPU 311 reads the global 2D code associated program to be executed correspondingly, namely the weather forecast program (step S4a of FIG. 20) and then the information of expiration period thereof (step S5a of FIG. 20). Then, the CPU 311 transfers the program and expiration period to the personal computer 1 over the network interface 317 (step S6a of FIG. 20).

The CPU 52 of the personal computer 1 controls the modem 50 to receive the global 2D code associated program and its expiration period from the global 2D code server 300a (step S17a of FIG. 21) and registers them into the local 2D code database 56Da in the HDD 56a (step S18a of FIG. 21). Next, the CPU 52 starts the registered weather forecast program and controls the LCD controller 83 to display the current weather forecast information (for example, a weather chart) on the LCD 21 (step S19a of FIG. 21).

Thus, in the personal computer 1, the global 2D code associated program, namely, the weather forecast program is executed.

The following describes the procedure of the processing by the CPU 52 of the personal computer to be executed when user C of the personal computer 1 uses the personal computer 1 to read the 2D code 101 to acquire weather forecast information again, namely, when the image data of the 2D code 101 is read again by the CCD video camera 23. It should be noted that, in this example, the weather forecast program is stored by the abovementioned processing in the local 2D code database 56Da in the HDD 56a and the expiration period of the program is valid during the processing to be described below.

When the image data of the 2D code 101 has been recognized, the 2D code ID thereof has been acquired, and the 2D code of that 2D code ID has been found of a global 2D code (steps S11a, S13a, and S14a of FIG. 21), the CPU 52 determines that the 2D code ID of the 2D code 101 is stored in the local 2D code database 56Da in the HDD 56a (step S15a of FIG. 21).

Next, the CPU 52 searches the local 2D code database 56Da to check the expiration period of the global 2D code associated program executed in correspondence to its 2D code ID. If the expiration period is found valid (step S20a of FIG. 21), the CPU 52 immediately (by skipping steps S16a through S18a) searches the local 2D code database 56Da again, acquires the weather forecast program, and executes the same. Consequently, the weather forecast information such as a weather forecast chart, is displayed on the LCD 21.

Thus, if the expiration period of the registered global 2D code associated program is valid, the CPU 52 can execute the global 2D code associated program without accessing the global 2D code server 300a.

In addition, by setting an expiration period optimum to a certain program to be executed, by setting the expiration period to a time at which weather forecast information is updated (every three hours for example), more effective services can be provided to users.

In the above-mentioned examples, the weather forecast program is a global 2D code associated program. It will be apparent that a "season's greeting card" creating program may be also used as a global 2D code associated program. Such a "season's greeting card" creating program can create greeting card formats such as a new year's card and a summer greeting card according to expiration periods set in advance.

Assume, for example, that user C used this "season's greeting card" creating program and created a summer greeting card during summer, and therefore this program has been already registered in the local 2D code database 56Da in the HDD 56a of the personal computer 1. When user C makes the personal computer 1 read the 2D code for executing the "season's greeting card" creating program in the end of a year, at which the expiration period of the program is invalid, the personal computer 1 receives the provision of the "season's greeting card" creating program from the global 2D code server 300a because the expiration period is invalid. When the newly provided "season's greeting card" creating program starts, a new year's card format is created this time. When user C makes the personal computer 1 read the 2D code for executing the "season's greeting card" creating program in next summer, a summer greeting card format is created this time.

Like the global 2D code associated program, the local 2D code associated program can set the expiration period. Also, as shown in FIG. 13, a group 2D code server 500 for controlling a 2D code (hereafter referred to as a group 2D code) to be shared by one group including the personal computer 1, the terminals 400-1 and 400-2 is provided to create a group 2D code associated program, to which an expiration period can be set. The group 2D code server 500 is the same in configuration as the global 2D code server 300a and stores the server program, the group 2D code associated program, the expiration period thereof, the 2D code ID of group 2D code, and the ID of the corresponding group 2D code associated program.

As mentioned above and according to the information processing apparatus defined in claim 1, the information processing method defined in claim 6, and the medium defined in claim 7, a request for executing the processing corresponding to the global identification information is made to a server. Consequently, the result of the execution of the processing corresponding to the global identification information can be obtained, to thereby obtain the same result of the execution of the processing corresponding to the global identification information, which is commonly used by all terminals.

A computer program designed to perform the above-described processes may be retained on such package media as floppy disks, CD-ROMs and DVDs; on semiconductor memories, magnetic disks and the like where the program is stored temporarily or permanently; on wired and wireless communication media such as local area networks, the Internet, digital satellite broadcasting networks; or in diverse communication interfaces such as routers and modems for transmitting or receiving the program offered by the foregoing media. Such media, networks, interfaces and other measures allow the program to be installed in computers for program execution. The storage medium as mentioned in this specification refers broadly to all such media, networks, interfaces and measures.

While a preferred embodiment has been described, variations thereto will occur to those skilled in the art within the scope of the present invention concepts which are delineated by the following claims.

What is claimed is:

1. An information processing apparatus comprising:
    an image acquiring means for acquiring an objective image;
    an identification information recognizing means for recognizing, of the objective image acquired by said image acquiring means, identification information corresponding to a specific image pattern;
    a decision means for deciding whether said identification information recognized by said identification information recognizing means is local identification information for starting processing previously registered for each terminal or any one of a plurality of codes representing global identification information for starting processing common to all terminals;
    a local executing means for executing, if said identification information is decided as the local identification information by said decision means, the processing previously registered for each terminal;
    a global processing requesting means for requesting, if said identification information is determined by said decision means to be any one of said codes representing the global identification information, a global code server that searches an associated global database having a plurality of stored codes and corresponding information to determine if the requested identification information corresponds to one of said stored corresponding information, to execute the global processing corresponding to said identification information; wherein if said decision means determines that said recognized identification information is a code representing global identification information, said local executing means first searches a local database to determine if a global information corresponding to said recognized identification information is stored therein, and if so, executes said global processing without said global processing requesting means making a request to said global code server and;
    a global processing result acquiring means for acquiring the result of said global processing by said global code server.

2. An information processing apparatus according to claim 1, wherein said identification information recognizing means extracts, of the objective image acquired by said image acquiring means, a visual code provided on an object, and recognizes identification information corresponding to an image pattern of the visual code.

3. An information processing apparatus according to claim 1, wherein said identification information recognizing means extracts, of the objective image acquired by said image acquiring means, a two-dimensional code provided on an object, and recognizes identification information corresponding to an image pattern of the two-dimensional code.

4. An information processing apparatus according to claim 1 wherein said corresponding information are corresponding programs.

5. An information processing apparatus according to claim 1 wherein said global information is a program.

6. An information processing apparatus comprising:
    an image acquiring means for acquiring an objective image;
    an identification information recognizing means for recognizing, of the objective image acquired by said image acquiring means, identification information corresponding to a specific image pattern;
    a decision means for deciding whether said identification information recognized by said identification information recognizing means is local identification information for starting processing previously registered for each terminal or global identification information for starting processing common to all terminals;
    a validity condition registering means for pre-registering a validity condition of said global identification information;
    a validity condition decision means for deciding whether or not said identification information recognized by said identification information recognizing means satisfies the validity condition registered in said validity condition registering means;
    a global processing executing means for executing, if said identification information is decided as global identification information by said decision means and is decided to satisfy said validity condition by said validity condition decision means, global processing corresponding to said identification information;

an update information requesting means for requesting, if said identification information is decided as global identification information by said decision means and is decided not to satisfy said validity condition by said validity condition decision means, update information associated with global processing corresponding to said identification information from a specific server; and an updated global processing executing means for updating the validity condition registered in said validity condition registering means on the basis of the update information acquired by said specific server and executing the updated global processing on the basis of said update information.

7. An information processing apparatus according to claim 6, wherein said validity condition is a condition in which an expiration date has not yet been reached.

8. An information processing method comprising:

an image acquiring step of acquiring an objective image;

an identification information recognizing step of recognizing, of the objective image acquired by said image acquiring step, identification information corresponding to a specific image pattern;

a decision step of deciding whether said identification information recognized by said identification information recognizing step is local identification information for starting processing previously registered for each terminal or any one of a plurality of codes representing global identification information for starting processing common to all terminals;

a local executing step of executing, if said identification information is decided as the local identification information by said decision step, the processing previously registered for each terminal;

a global processing requesting step for requesting, if said identification information is determined at said decision step to be any one of said codes representing the global identification information, a global code server that searches an associated global database having a plurality of stored codes and corresponding information to determine if the requested identification information corresponds to one of said stored corresponding information, to execute the global processing corresponding to said identification information; wherein if it is determined at said decision step that said recognized identification information is a code representing global identification information, a local database is first searched to determine if a global information corresponding to said recognized identification information is stored therein, and if so, said global processing is executed without making a request to said global code server in said global processing requesting step and;

a global processing result acquiring step of acquiring the result of said global processing by said global code server.

9. An information processing method according to claim 6 wherein said corresponding information are corresponding programs.

10. A medium storing information which allows an information processing apparatus to execute instructions to carry out a method comprising:

an image acquiring step of acquiring an objective image;

an identification information recognizing step of recognizing, of the objective image acquired by said image acquiring step, identification information corresponding to a specific image pattern;

a decision step of deciding whether said identification information recognized by said identification information recognizing step is local identification information for starting processing previously registered for each terminal or any one of a plurality of codes representing global identification information for starting processing common to all terminals;

a local executing step of executing, if said identification information is decided as the local identification information by said decision step, the processing previously registered for each terminal;

a global processing requesting step for requesting, if said identification information is determined at said decision step to be any one of said codes representing the global identification information, a global code server that searches an associated global database having a plurality of stored codes and corresponding programs to determine if the requested identification information corresponds to one of said stored programs, to execute the global processing corresponding to said identification information; wherein if it is determined in said method at said decision step that said recognized identification information is a code representing global identification information, a local database is first searched to determine if a global information corresponding to said recognized identification information is stored therein, and if so, said global processing is executed without making a request to said global code server in said global processing requesting step and;

a global processing result acquiring step of acquiring the result of said global processing by said global code server.

11. A medium according to claim 10 wherein said information stored by said medium is a program.

12. An information processing method comprising:

an image acquiring step of acquiring an objective image;

an identification information recognizing step of recognizing, of the objective image acquired by said image acquiring step, identification information corresponding to a specific image pattern;

a decision step of deciding whether said identification information recognized by said identification information recognizing step is local identification information for starting processing previously registered for each terminal or global identification information for starting processing common to all terminals;

a validity condition registering step of pre-registering a validity condition of said global identification information;

a validity condition decision step of deciding whether or not said identification information recognized by said identification information recognizing step satisfies the validity condition registered in said validity condition registering step;

a global processing executing step for executing, if said identification information is decided as global identification information by said decision step and is decided to satisfy said validity condition by said validity condition decision step, global processing corresponding to said identification information; an update information requesting step of requesting, if said identification information is decided as global identification information by said decision step and is decided not to satisfy said validity condition by said validity condition decision step, update information associated with global processing corresponding to said identification information from a specific server; and an updated global processing executing step for updating the validity condition registered in said validity condition registering step on the basis of the update information acquired by said specific server and executing the updated global processing on the basis of said update information.

13. An information processing method according to claim 10, wherein said validity condition is a condition in which an expiration date has not yet been reached.

14. A medium storing information which allows an information processing apparatus to execute instructions to carry out a method comprising:

an image acquiring step of acquiring an objective image;

an identification information recognizing step of recognizing, of the objective image acquired by said image acquiring step, identification information corresponding to a specific image pattern;

a decision step of deciding whether said identification information recognized by said identification information recognizing step is local identification information for starting processing previously registered for each terminal or global identification information for starting processing common to all terminals;

a validity condition registering step of pre-registering a validity condition of said global identification information;

a validity condition decision step of deciding whether or not said identification information recognized by said identification information recognizing step satisfies the validity condition registered in said validity condition registering step;

a global processing executing step for executing, if said identification information is decided as global identification information by said decision step and is decided to satisfy said validity condition by said validity condition decision step, global processing corresponding to said identification information;

an update information requesting step of requesting, if said identification information is decided as global identification information by said decision step and is decided not to satisfy said validity condition by said validity condition decision step, update information associated with global processing corresponding to said identification information from a specific server; and an updated global processing executing step for updating the validity condition registered in said validity condition registering step on the basis of the update information acquired by said specific server and executing the updated global processing on the basis of said update information.

15. A medium according to claim 14, wherein said validity condition is a condition in which an expiration date has not yet been reached.

16. A medium according to claim 14 wherein said information stored by said medium is a program.

* * * * *